INVENTOR.
KARL C. SCHMOCKER

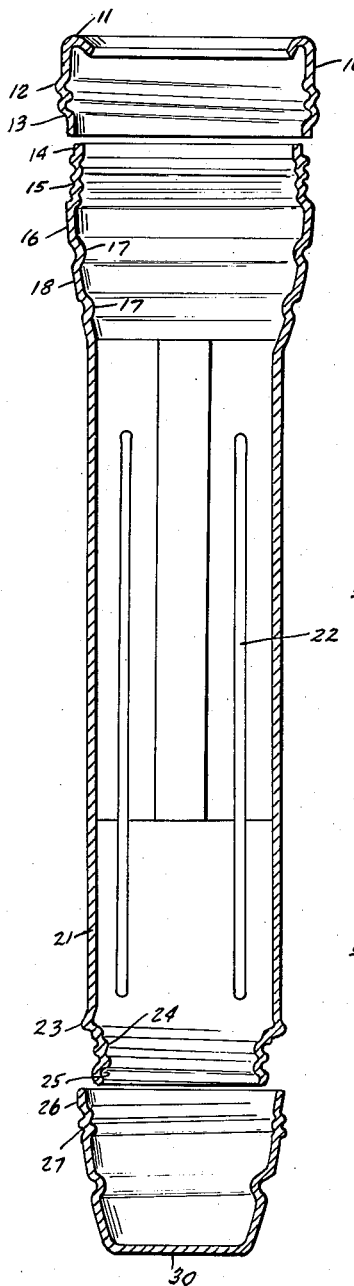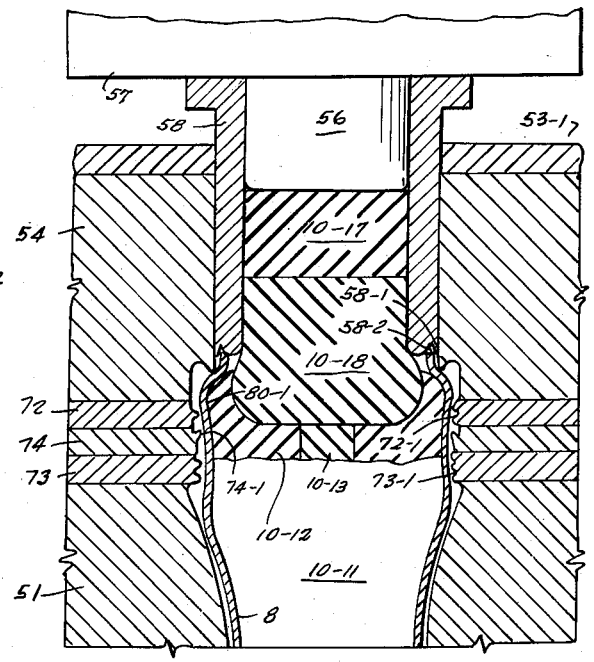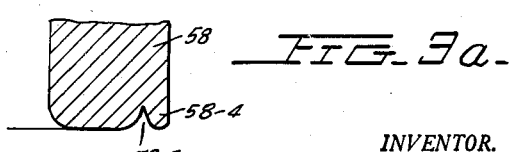

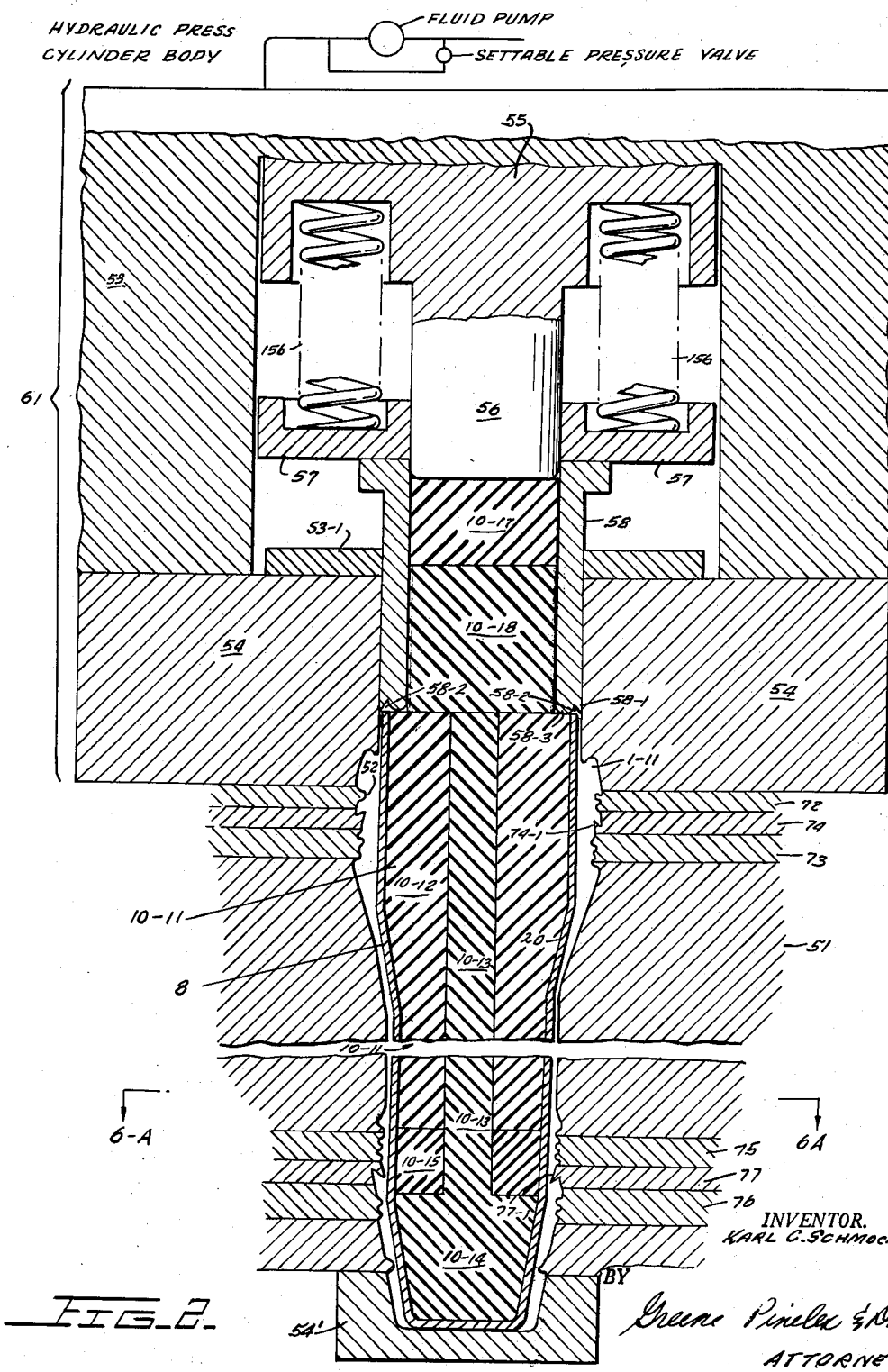

BY Greene, Pineles & Durr
ATTORNEYS

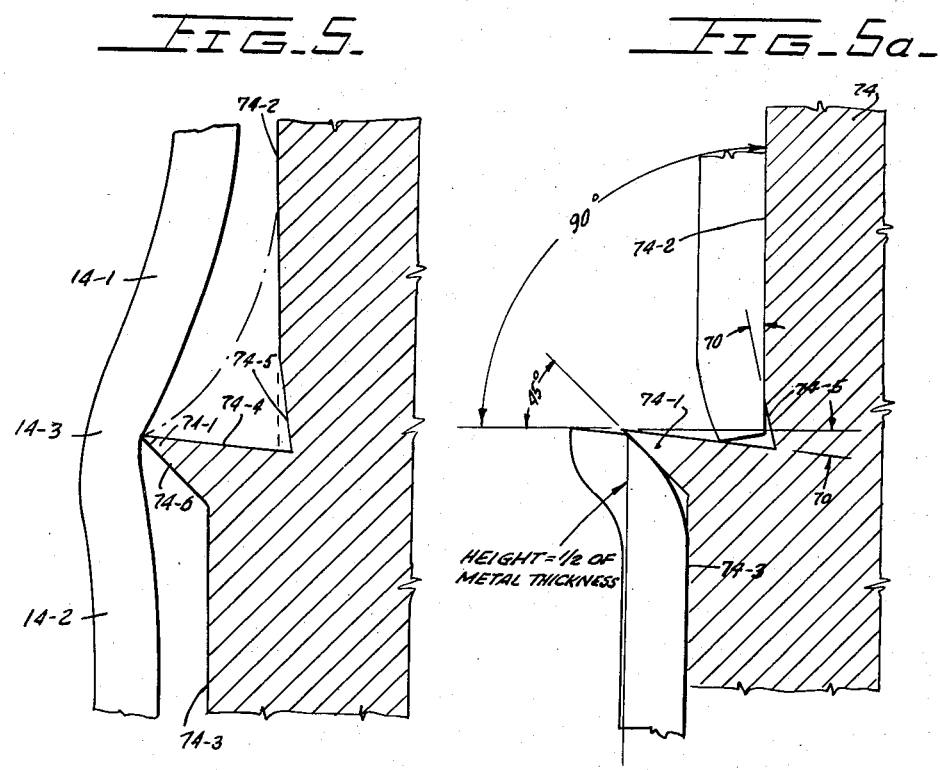
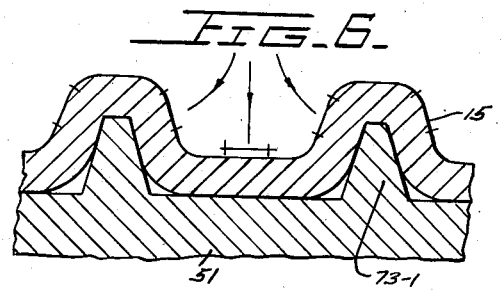
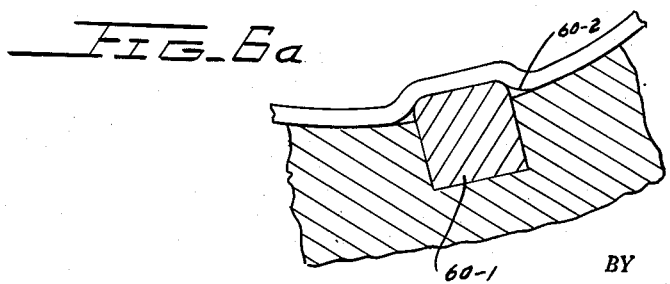

Jan. 3, 1961
K. C. SCHMOCKER
2,966,872
FORMING SHAPED HOLLOW METAL ARTICLES
AND EQUIPMENT THEREFOR
Filed Nov. 2, 1953
8 Sheets-Sheet 5
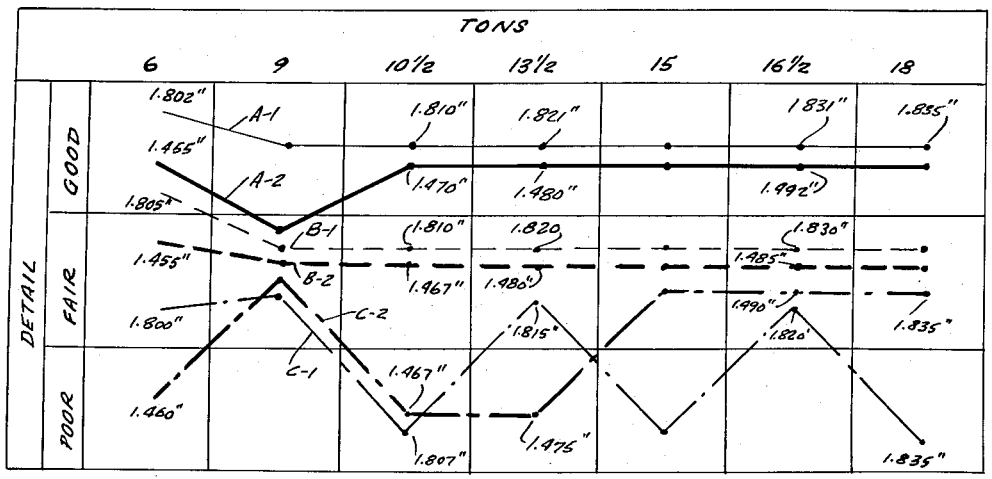
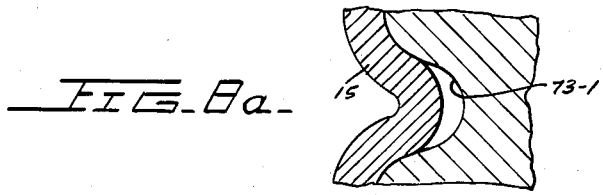
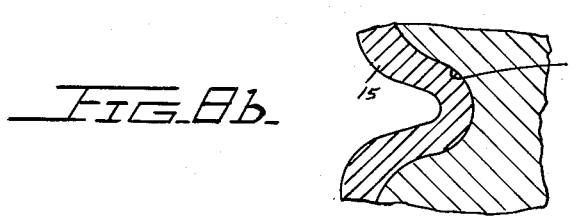
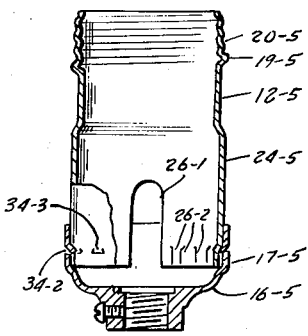
INVENTOR.
KARL C. SCHMOCKER
BY
ATTORNEYS

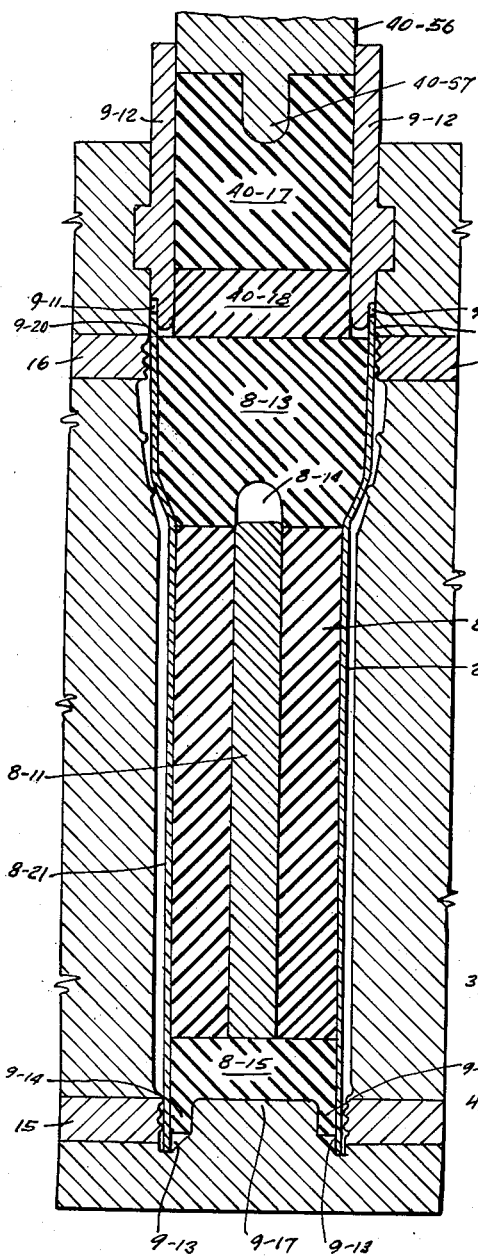
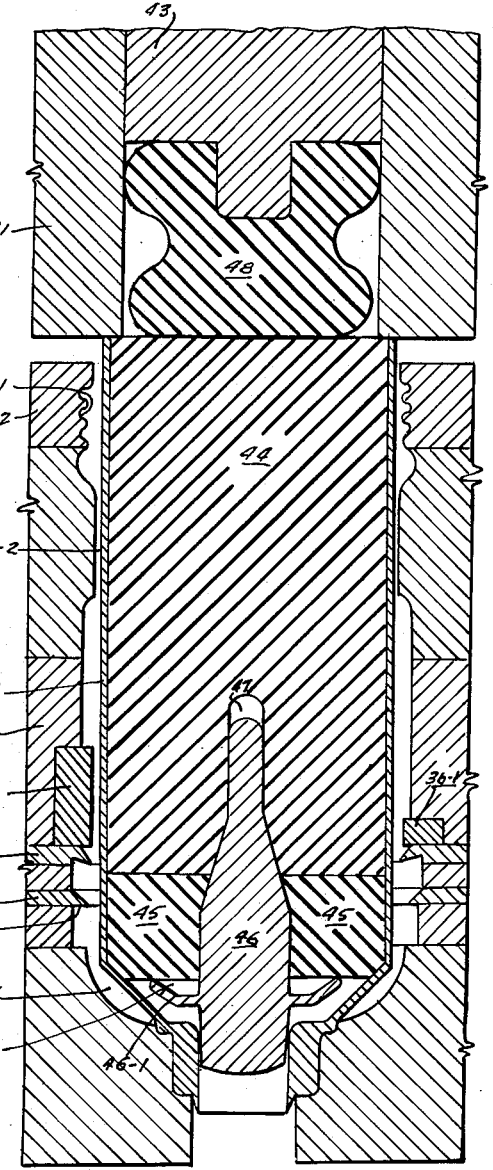

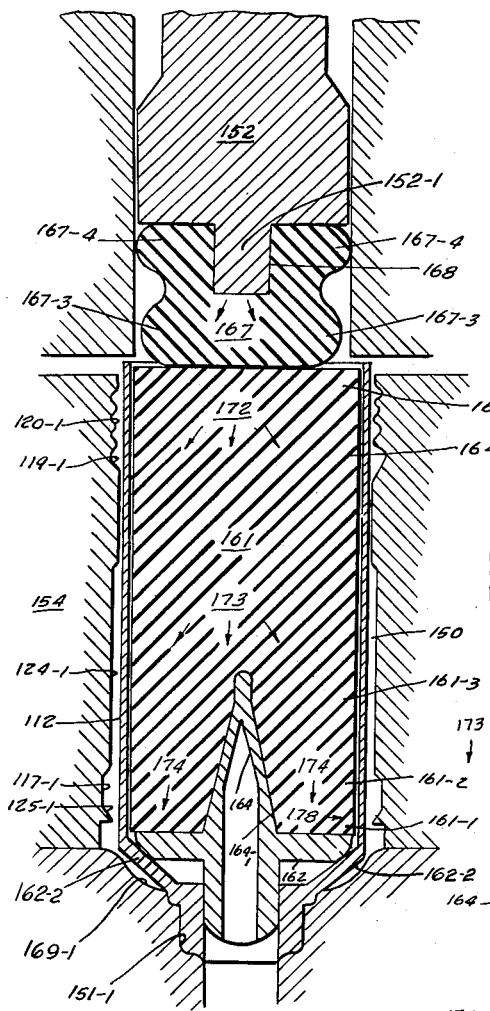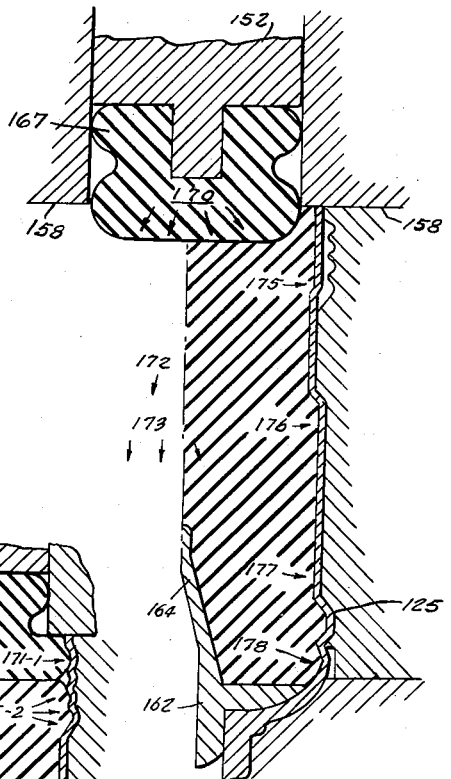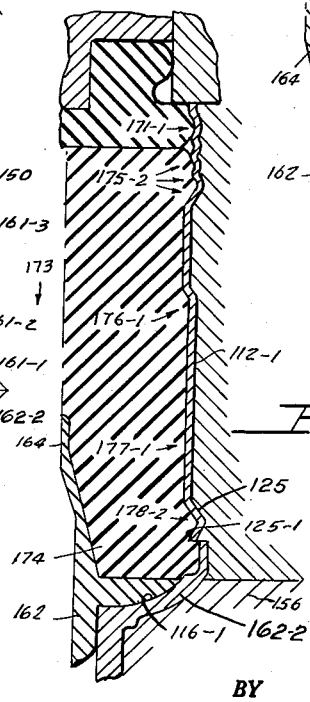

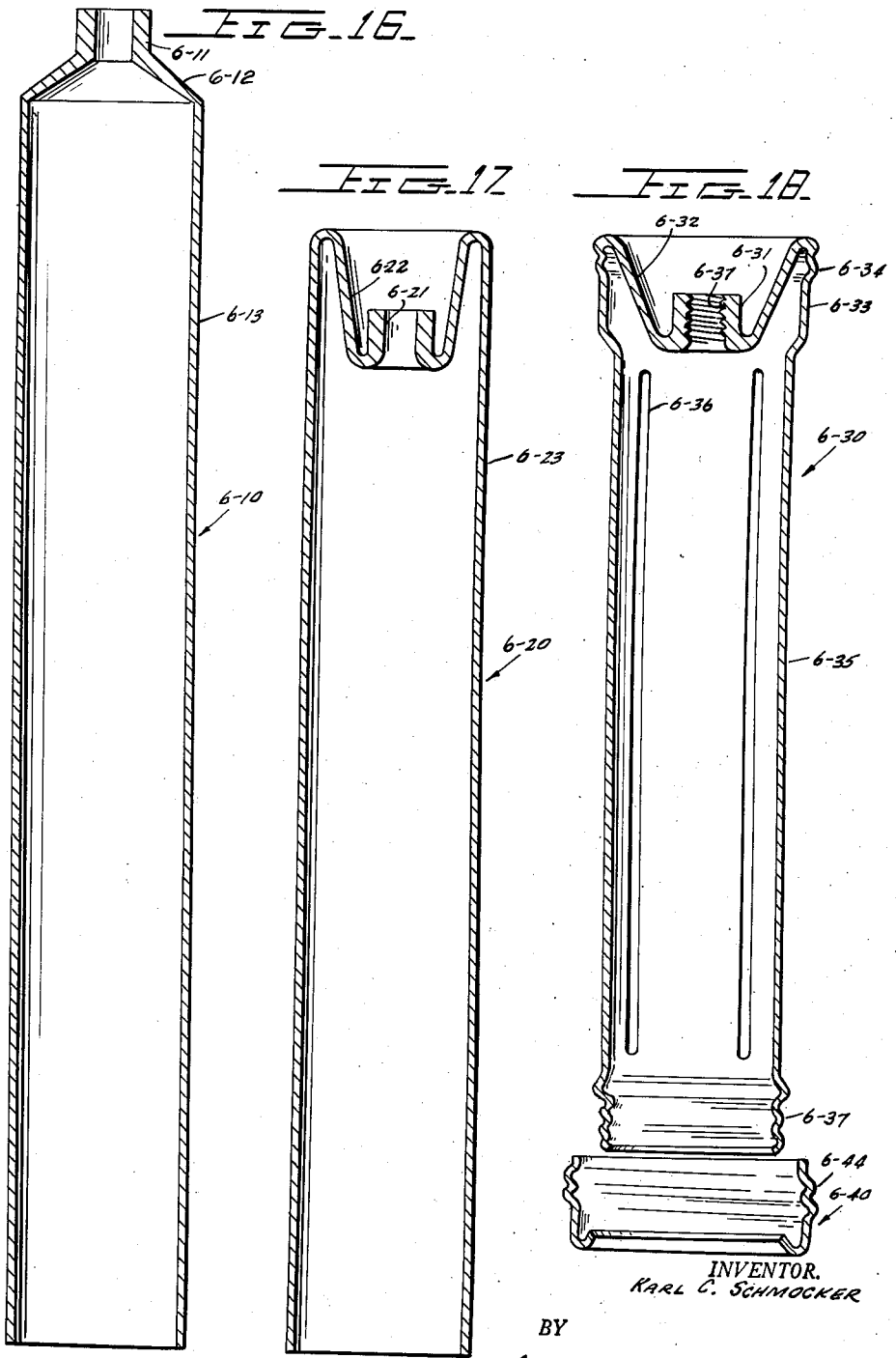

United States Patent Office 2,966,872
Patented Jan. 3, 1961

2,966,872

FORMING SHAPED HOLLOW METAL ARTICLES AND EQUIPMENT THEREFOR

Karl C. Schmocker, White Plains, N.Y., assignor, by mesne assignments, to Ryerson & Haynes, Inc., a corporation of Michigan Filed Nov. 2, 1953, Ser. No. 389,526

34 Claims. (Cl. 113—44)

This invention relates to the production of hollow metal articles of intricate shape from hollow blanks or shells and particularly from work-hardened blanks or shells of tubular or cup-type by applying an internal bulging pressure in a unique predetermined fashion to said shell or blank. This application is a continuation-in-part of my prior application Serial No. 274,551, filed March 3, 1952 and now abandoned.

One of the objects of the invention is to provide a novel procedure for bulging a metal shell to produce the exact mirror image of a female die.

Other objects of the invention are to provide a method and apparatus for obtaining an article of hard metal having the appearance and physical characteristics of a die stamped article including therein fine details of the desired shaped article.

A further object of the invention is to provide a bulging procedure which is successful in reproducing in one operational step, one, two or more separate, accurately formed parts of a tubular article having detailed re-entrant portions, from work-hardened blanks or shells which could not heretofore be reshaped by bulging to produce such an article.

It is a further object of this invention to provide a novel bulging process wherein a hollow metal blank is bulged in such a fashion as to produce an article of relatively complex shape wherein no substantial thinning and stretching of the metal in the wall portions of the blank is effected during the bulging process.

It is another object of this invention to provide a unique apparatus for bulging hollow metal blanks in such a fashion and in a single operating stroke of the apparatus wherein no substantial thinning and stretching of the metal in the wall portions of the blank is effected.

It is a further object of this invention to provide a novel process for bulging hollow metal blanks wherein the metal is controllably flowed into predetermined contours without at the same time substantially stretching or thinning the metal in the wall portions of the blank.

It has already been proposed, heretofore, to bulge and expand a shell of the tubular or cup-type against the inner surface of a female die. Heretofore, it has been extremely difficult to form by bulging articles of a relatively complex shape, particularly when the original starting blanks or shells are made from previously work-hardened metal. This work-hardening is imparted to the metal of the starting blank either during drawing, blanking or impact extruding of the same. In such cases, the application of high bulging pressures has sheared or split the metal tube or cup.

One phase of the instant invention is based on discovery that such shearing and splitting of the blank is due to the stretching and thinning of the metal in the blank at particular areas during the bulging operation. Stretching and thinning of the metal ordinarily takes place due to frictional locking of the metal with the die surfaces under die pressure. When this occurs, any further movement of the metal at the point of frictional locking can take place only by stretching and elongating of the metal in the areas adjacent the point of frictional locking. Another phase of the invention provides a novel bulging process which produces out of a single metal blank, several separately shaped metal parts by a single bulging stroke.

In general, the objects of the instant invention are accomplished by positioning a blank within a hollow female die cavity having a predetermined configuration. Thereafter, a body of elastic rubber-like material is positioned in the metal blank and axial pressure applied to a selected portion of the body. The pressure applied to the body is controllably channeled through the body so as to effect a radial outward flow of the metal in the blank at a predetermined point which is spaced from the starting point of the said axial pressure. Thereafter, the metal is caused to flow radially outward in progressive increments from this predetermined point back toward the point of the initial axial pressure so as to conform the blank in general to the predetermined configuration of the die cavity and without substantially stretching and thinning the metal of the blank. It is also desirable to partially shrink the blank axially or lengthwise in the female die cavity so as to feed the metal in the blank towards selected wall areas of the cavity during the initial application of a lateral or outward bulging pressure to the blank.

The foregoing and other objects of the invention will be best understood from the following description of exemplifications thereof, reference being had to the following drawings, wherein Fig. 1 is a longitudinal cross-sectional view of a three-part flashlight casing exemplifying one form of device made by a process exemplifying the principles of the invention;

Fig. 2 is a partially diagrammatic and partially cross-sectional view of a bulging equipment for producing out of a single hard metal blank the three-part flashlight housing of Fig. 1 by a process exemplifying the invention;

Fig. 3 is a detail view similar to Fig. 2, but showing a partially bulged blank;

Fig. 3a is an enlarged detailed sectional view of a portion of a modified ram bushing;

Figure 4:
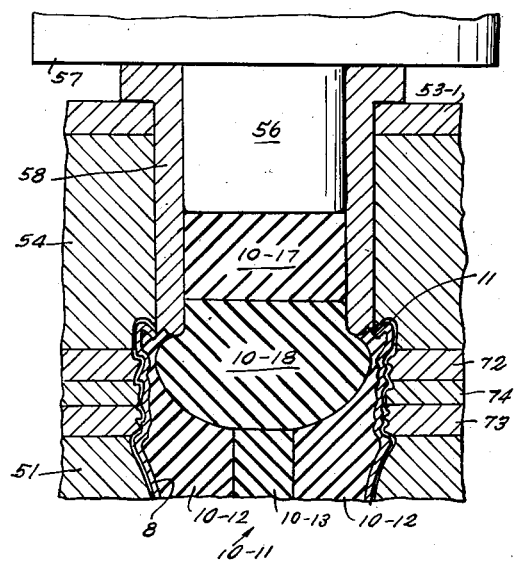
Fig. 4 is a view similar to Figs. 2 and 3 of portions thereof showing approximately the shape and positions of the rubber ram plunger and associated elements just before the final bulging pressure is reached.
Figure 4A:
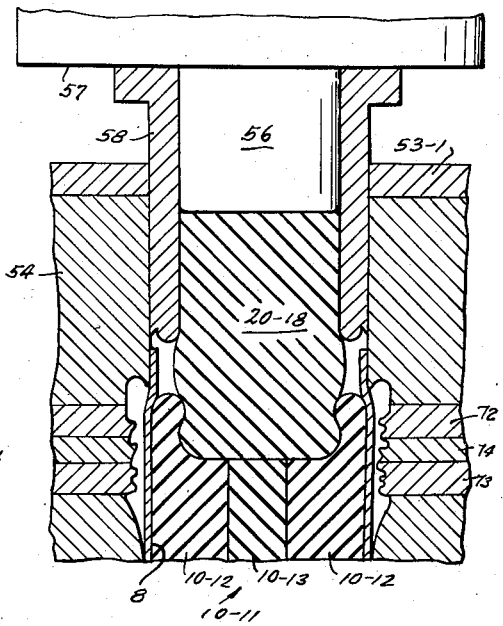
Figure 4B:
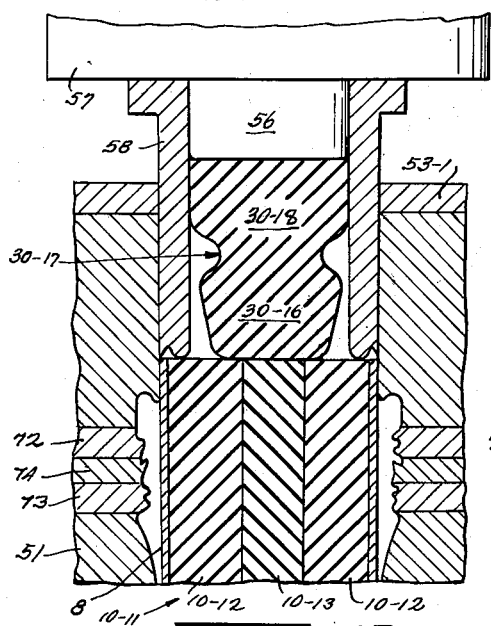
Figure 4C:
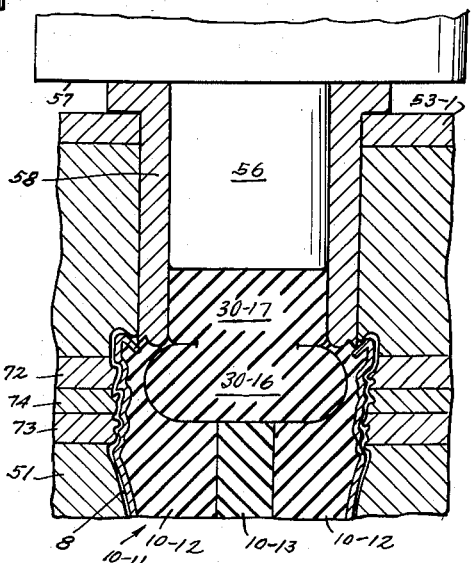

Figs. 4–A to 4–C are views similar to Fig. 3 showing similar equipment when operating with modified forms of rubber ram plungers;

Fig. 5 is a detail view similar to Fig. 2 illustrating parts thereof when performing a severing step at the start thereof;

Fig. 5–A is a view similar to Fig. 5, but showing the finish of the severing step;

Fig. 6 is a detail view similar to Fig. 2 showing the parts which form threaded portions of the desired article at the final bulging pressure;

Fig. 6–A is a detail horizontal cross-sectional view along line 6–A—6–A of Fig. 2 showing the parts which form the formation reinforcing ribs at the final bulging pressure;

Fig. 7 is a group illustrating how the formation of the shape details of the product is influenced by the nature of the male bulging structure;

Figs. 8–A and 8–B are enlarged detail views similar to Fig. 6 giving a comparison in the formation of partially completed and a fully completed detail of the product;

Fig. 9 is a view similar to Fig. 2 of a modified form of equipment exemplifying the invention;

Fig. 10 is a view similar to Fig. 2 of another modified form of equipment of the invention used for forming a two-part socket housing by a process of the invention; and Fig. 11 is a cross-sectional view of a two-part socket produced by the equipment of Fig. 10;

Fig. 12 is a perspective illustration, in section, of a cast metal slug from which an elongated tubular blank is formed;

Fig. 13 is a view similar to Fig. 10 of a modified form of the bulging apparatus of the invention, used for forming a two-part socket housing;

Fig. 14 is a partial view similar to Fig. 13, in an intermediate portion of its forming operation;

Fig. 15 is a partial view similar to Figs. 13 and 14, showing the final forming step thereof; and Figs. 16, 17 and 18 illustrate in cross-section a modified shaped housing structure, namely a flashlight housing, in successive stages of its formation.

*Three-piece flashlight housing*

The principles and features of the invention will be explained by considering an important practical application thereof by way of example, in connection with forming out of a thin hollow metal blank of relatively hard metal by a single forming stroke a three-piece flashlight housing as shown in Fig. 1. This housing consists of a relatively wide lensring, an adjoining relatively long main flashlight housing shell and a bottom cap with the lensring and the bottom cap arranged to be detachably joined to the opposite ends of the housing shell by thread or bayonet-type formations imparted thereto by the forming stroke.

In the illustrative form of flashlight housing shown, the blank is made of a suitable metal such as hard brass, aluminum, steel or the like. In a typical application of the invention, the blank was of brass and it had a wall thickness of .0155 inch. The height of the finished article was approximately 7½ inches and the blank out of which it was formed was approximately 5/16 inch longer. The grain structure of the brass blank ranged from .020 mm. to .035 mm. giving it substantial hardness and excellent finishing quality. The upper part of the blank was wider, having an inner diameter of 1 9/16 inch and the outside diameter of the body thereof was approximately 1 7/16 inch.

A typical finished three piece flashlight housing made of this blank had the following characteristics conforming to the inner shape of the die cavity shown in Figs. 1 and 2, to wit:

Largest outside diameter of the blank was 1⅞ inch at the lensring 11 and adjoining wider upper part thereof. The body had an outside diameter of 1½ inches. To give the body increased strength, the die cavity was provided along its inward surface with longitudinal forming ridges which gave the main part of the body longitudinal inward flute-like ridges.

Fig. 1 is a cross-sectional view of the three-part flashlight housing made from the blank, generally designated, by the shape shown in Fig. 2. The lensring 10 has an upper flange 11 and a threaded portion 12 with an adjoining lead-in edge 13. The upper part of the finished housing shell has a lead-in edge 14 which fits inside of the adjoining threaded portion of the lensring. The lead-in edge 14 of the housing shell is adjoined by a threaded portion 15 which in turn is adjoined by a bulge section 16 which is of such outside diameter that when the lensring is screwed into its position on the threaded portion 15 of the housing, it will be properly seated on the upper edge of the shell bulge 16. By this arrangement, the lead-in edge 13 of the lensring forms with the adjoining shell bulge 16 a continuous outer surface region of the assembled flashlight housing thereby eliminating troubles due to catching on the sharp edge of the exposed lead-in edge of the lensring.

Inward ridges or flutings 17 and an intermediate tapered part 18 of the shell serve as reinforcements therefor, while providing a decorative effect. The main, generally tubular housing shell 21 is provided with longitudinal ribs or flutes 22 which provide it with great rigidity. The bottom portion of the housing shell has provided therein a bead 23 which increases the rigidity in this region and also serves as a stop for the edge of the bottom cap in its screw-in position.

The bead portion 23 of the housing shell is adjoined by a threaded bottom portion 24 and an adjoining lead-in portion 25.

The threaded end portion of the housing shell is arranged for cooperation with the cap 30 which has the following elements: lead-in portion 26 at the upper edge thereof followed by a threaded portion 27 shaped to make threaded engagement with the threaded portion 24 of the housing shell. The end portion 26 of the cap fits against the bead 23 of the housing shell and forms therewith a substantially continuous surface without any projecting cap edge.

*The female die*

The female die is of the split type in Fig. 2. In the form shown, the die 51 has formed therein a die cavity 52 and is arranged so as to open on a middle parting plane through the longitudinal axis of said die cavity 52. The die 51 is arranged for the cooperation with a die head 53, a head plate 54 and a bottom plate 54'. The die cavity 52 is bounded by shaped inner cavity surface portions corresponding to the different parts of the outer shape of the three part flashlight housing described above. The head 53 houses the ram or ram assembly 55 of the press which is provided with a ram plunger 56. The ram 55 is arranged to move with the head 53 and to move independently in a downward direction after the head plate 54 has been lowered to a downward position in which it forms part of the cavity boundary—namely the cap part. The ram 55 is part of the hydraulic cylinder of the press and is moved up and down by the hydraulic pressure. As the ram is moved downwardly, it applies pressure through an array of springs 156 to a pressure plate 57 carrying at its lower end the ram bushing 58 having an inner bore in which the ram plunger 56 is guided in up and down movement. The over-all head part 61 of the bulging apparatus comprising the head 53 and the head plate 54 is arranged to be moved up and down with the ram 55 by interposed spring elements not shown, so that when the ram is in its upward position, the head is spaced from the upper surface of the die by about 1 to 1½ inches. When the ram is moved in downward direction, the head 61 is brought downward to close the die cavity and at a later stage of the downward movement of the ram 55, the solid plunger 56 of the latter moves downwardly within the ram bushing 58 towards the die cavity.

In the form shown, the parts of the die which serve to cut the blank and form threads therein are assembled out of separate inserts as follows: Two inserts 72, 73 form the threads in the lensring and the cooperating threads 15 in the upper part of the housing shell respectively. An insert 74 which is positioned between the two thread inserts 72, 73 has a cutting edge 74—1 which parts or cuts the lensring from the housing shell.

The lower part of the die has a similar set of inserts, to wit, two thread-forming inserts 75, 76 which form the threads 24 and 27 in the lower part of the housing shell and in the adjoining cap respectively. Between the two thread-forming inserts 75 and 76 is positioned a parting or cutting insert 77 provided with a cutting or parting edge 77—1 which parts the cap from the lower part of the housing shell. The die cavity parts 1—11 which serve to form the upper portion of the lensring are formed in the head plate 54 which is not parted when the two part die is opened. As shown, a spacer ring 53—1 is positioned above the head plate 54 and serves to limit the downward stroke of the ram bushing 58.

The spaced thread-forming inserts at the upper and lower ends of the die cavity provide axially spaced cavity wall recesses which are of different depths and require controlled and channelled bulging pressures on the blank to fill the recesses.

The elastic bulging core and ram bodies

The shaping and cutting of the blank to form a three-part flashlight housing are all effected by use of elastic flowable body elements made from rubber or rubber-like materials. These materials are chosen and correlated to secure a predetermined differential pressure action on the different parts of the blank in a controlled sequence of operations so that by means of a single relatively rapid pressure stroke applied by the ram assembly 55 and its associated parts a blank will be formed into a three-part flashlight housing.

In the particular application here described, the flowable bulging element is chosen and arranged as follows. Within the blank is placed a composite bulging core generally designated 10—11 composed of an outer core body 10—12 within which is positioned an inner core body 10—13. The outer core body 10—12 terminates at a level slightly above the level of the threaded bottom portion of the female die. The inner bulging core 10—13 has a wider bottom portion 10—14 which is separated from the bottom surface of the outer core body 10—12 by a generally ring-shape bulging body 10—15. In the particular application, the outer bulging core portion 10—12 consists of rubber having about 60 durometer hardness, the inner core body 10, 13 consists of rubber of about 40 durometer hardness, and the intermediate rubber body 10—15 has about 70 durometer hardness.

In order to impart to the composite flowable bulging core 10—11 the desired differential shaping forces, it is subjected to the compressive force of a ram-like body of generally similar flowable elastic material such as rubber. In the form shown in Fig. 2, the over-all bulging ram body or ram is formed of an inner rubber-like ram body 10—17 of 70 durometer hardness and an adjoining outer rubber-like ram body 10—18 of 40 durometer hardness. Good results are obtained by making the bulging core in its uncompressed free state of a width about .025" smaller than the inside width of the blank through which it is moved at the start of the bulging process.

Operation of the cutting and detail forming features

The following features of the equipment shown have a critical bearing on its operation in forming out of the simple hard metal blank the shaped three-part flashlight housing. The lower edge of the ram bushing or sleeve-like member 58 has formed therein a knife edge 58—1, separated by a recess or space 58—2, from the rounded innerlip or nose piece 58—3 thereof. The shape of these parts is of critical importance for the following reasons. As the ram bushing 58 moves down in the initial part of the stroke, the recess 58—2 serves to center the upper edge of the blank in proper position relatively to the rubber ram body 10—18. In the further downward movement of the ram bushing 58 along with ram plunger 56, the rubber ram body 10—18 is compressed and it tends to spread outwardly in the direction against the upper region of the side walls of the blank below its upper edge. The engagement or closed gap spacing between the upper edge of the blank 8 and the facing surface portions of the nose part 58—3 of the ram bushing 58 prevents or suppresses entry of the outwardly bulged rubber material of the rubber ram body 10—18 and the rubber core 10—11 engaged thereby into the space beyond the outer edge of the blank which would otherwise cause distortion and rolling over of the edge of the blank 8 or doubling over thereof over the adjoining inner region thereof. As the nose 58—3 of the ram bushing 58 moves further downwardly, the upper portion of the blank 8—which is being turned downward by the combined simultaneous outward expansion of the rubber ram body 10—18 and the rubber core 10—11—meets the knife edge 58—1 of the ram bushing, which, in the course of the further movement of the ram bushing 58 cuts and sizes the inwardly turned upper edge of the blank 8 which now forms the interior flange of the lensring.

Alternatively, as shown in Fig. 3-A, what was described above as the cutting knife edge 58—1 of the ram bushing 58, may be shaped as a sizing edge 58—having a rounded outwardly tapering end surface extending from the lower edge of the downwardly tapering outer surface of the recess 58—3 corresponding to recess 58—2 of Fig. 3. The ram bushing 58 is thus provided with a rounded sizing edge 58—4 which with its outer tapered surface engages the inwardly turned upper edge of the metal blank and thereby shapes and sizes it and thus determines the size of the opening in the inner flange edge of the lensring. With the latter arrangement, the sizing of the lensring does not involve the cutting of any scrap in sizing the ring opening.

The critical features of the cutting edge portion 74—1 of the cutting insert 74 with which the lensring is parted from the upper part of the shell blank will now be described.

In the form shown, see Figs. 2, 5 and 5-A, the parting knife edge 74—1 extends between two generally cylindrical surface portions 74—2, 74—3 of the cutting insert, the surface portion 74—2 being of greater internal diameter than the cylindrical surface portion 74—3 to provide the outer cylindrical part of the lensring with a somewhat greater diameter than the upper lead portion of the shell housing which comes to rest against the inner cylindrical surface portion 74—3. The cutting edge 74—1 is provided with an upper surface 74—4 which forms an angle of about 90°—7° or 83° with the vertical surface 74—2 to provide clearance. In addition, the adjoining surface portion 74—5 of the surrounding surface body 74—2 of the die is slanted in an outwardly direction and at a similar angle of 7° relatively to the continuation of the cylindrical surface 74—2. The so-formed inclined surfaces 74—4, 74—5 adjoining the cutting edge 74—1 are inclined to each other by an angle 90°—14° or 76°.

The downwardly projecting surface 74—6 of the cutting edge 74—1 is inclined at about 45° to the vertical and it forms with the upper downwardly inclined surface 74—1 of the edge a relatively sharp cutting edge. The total height of the cutting edge projecting inwardly beyond the cylindrical surface 74—3 of the cutting surface is less than the thickness of the blank and of the final shell housing formed therefrom.

With the foregoing arrangement of the cutting edge, the pressure forces applied by the rubber-like bulging core or plug against the inner surface of the tubular blank operates as follows: The initial outward bulging pressure applied against the wall region 14 of the blank 8 causes it to move or flow outwardly into two outwardly disposed bulged regions 14—1, 14—2 with an intermediate region 14—3 engaging the inner sharp edge of the cutting edge 74—1. It is important that the curvature of the bend 14—1 follow the largest possible radius so that the blank 8 is parted in the region opposite the cutting edge 74—1 along a smooth parting line without materially lengthening and thinning the part 14—1 of the blank which forms the upper bulge.

As the blank 8 is forced outwardly by the applied preliminary bulging forces, a large part of the pressure is applied in the region 14—3 against the cutting edge 74—1 and the said region becomes thinner until it fractures from the inside as it is parted or cut by the knife edge 74—1 from the outside, without leaving any detrimentally sharp or ragged edges. As the blank is so parted by the cutting edge 74—1, the upper part 14—1 of the blank is moved outwardly by the bulging body 10—11 into the outwardly tapered recess formed by the surfaces 74—4, 74—5, accommodating therein the somewhat but for all practical purposes negligibly lengthened upper part of blank wall part 14—1 with its lowermost edge butting into the relief recess adjacent surface 74—4 along which it is smoothed out as it reaches its outward final position in the subsequent stages of the bulging operation when full pressure is applied to the bulging body.

It should be noted that in the specific form of the process of the invention described above, the cutting or parting operation is performed in an initial stage of the bulging operation. Thus, in a specific application of the invention, wherein the flashlight housing is formed with a final ram pressure of 18 tons applied to the ram body 10—18, the parting operation is completed when the pressure applied to the bulging ram body is about 5 tons (ton=2000 pounds).

As the outwardly pressed bulging rubber core 10—11 acts on the adjoining lower parted wall portion 14—2 of the blank, it is forced towards the lower surface region 74—6, 74—3 of the cutting insert giving it a substantially smooth surface with the end edge surface portion thereof of somewhat reduced thickness which for all practical purposes is negligible. It is the coordination between the type of cutting edge and the control over the preliminary pressure which provides rounded edges for the finished article and the rounding is assisted by the subsequent additional flow of the rubber-like bulging core of the later or immediately following stages and without these features, as in the previously known bulging processes, sharp radii having a sharp edge and ragged edges requiring separate trimming operations result.

In the further progress of the forming operation as the bulging pressure increases to about 15 tons, the blank wall regions 14—1, 14—2 are forced with sufficient pressure against the thread regions 72—1, 73—1, of the thread inserts 72, 73 for forming the blank portions into the threaded portions 12 and 15 respectively. The thread formations may be of many shapes, but a preferred type is shown in Fig. 6, this type forming a very desirable thread which cannot be made by a single process step in any other known way. The thread is formed with a greater height than the conventional threads used in similar applications and the pitch of the thread is somewhat larger. Thus, whereas in similar prior applications, the thread height is only about 0.024 inch with a pitch of 0.071 inch, the thread of Fig. 6 has a height of 0.030 inch and a pitch of .100 inch. This thread formation is of great advantage in securing good interlocking engagement between mating threaded pieces, because the mating threads engage each other in the radially inclined regions as well as in the central regions of the cylindrical parts as indicated in Fig. 6 by arrows. On the other hand, standard rolled threads heretofore formed on similar blanks by a rolling operation engage at most only along a short portion of the individual threads.

The flutes 22 and similar other parts are formed by a novel die arrangement of the invention. In the past the parting line between adjacent die parts required for imparting different shape or configuration to a hard metal blank have as a rule been given a smooth merging mating surface. In accordance with this invention, the parting lines of adjacent parts of the die used for giving different shapes to adjacent portions of the blank are indented or offset with respect to each other, thereby protecting the die regions adjoining the parting line. This also removes the possibility of impressing a flash line on the blank by the parting line region of the die.

This phase of the invention is illustrated in Fig. 6–A showing in detail a portion of the die cylindrical cavity region having mounted therein a die insert 60—1 which is used for forming in the shell blank a longitudinal flute. It will be noted that the parting line of the die insert 60—1 is generally perpendicular to the circular cavity surface of the die. As the expanding bulging core forces the blank in outward direction, it gives the blank wall portions adjoining the die insert 60—1 curved regions 60—2 of perfect radius without touching the parting line between the die insert 60—1 and the adjoining region of the cavity die. As distinguished therefrom, prior to the present invention, the die insert 60—1 was formed with radii of greater width than shown and had shaped therein curved surface regions conforming to the radius which is to be imparted to the curved shape of the blank by which the inward region of the flute adjoined the outer surface portions of the shaped article.

The features of the invention described above in connection with severing the lensring from the upper part of the blank and forming in the adjoining regions of the lensring and the blank the threaded inter-engaging shape tooth regions apply also to the process steps by which the cap 30 is parted from the lower region of the blank and by which the adjoining regions of the cap 30 and by which the shell blank are given the desired shape of inter-engaging thread or locking surfaces.

*The individual steps of the shaping process*

It is assumed that the ram head 53 is in open retracted position away from the die and that the die has been open to discharge a completed three-part flashlight housing formed therein. The process is applied to a blank of the shape shown having a length of about 8½ inches.

The blank 20 is positioned between the split die parts, the rubber core 10—11 having been previously positioned therein.

With the die closed, the ram plunger 56 descends and in the initial downward movement, the die head plate 54 is properly positioned to close the die. At the moment when the die head plate 54 is brought to closed position, the ram plunger 56 applies only negligible pressure to the rubber ram body section 10—18.

In the further downward movement of the ram plunger 56 as the pressure is raised to about 1 ton, this pressure is transmitted to the bottom rubber core region 10—14 in the bottom of the die, thereby causing it to bulge slightly in an outward direction. As the pressure applied to the core increases to from 1 ton to 4 tons, the other regions of the core 10—11 are forced slightly outwardly beginning progressively from the portions immediately adjacent the core region 10—14 and backwardly to where the pressure is initially applied by the ram body section 10—18. Thus, when the 4 ton pressure has been reached, the blank 8 will have been bulged in an outwardly direction without any substantial thinning or stretching of the wall portions of the blank so as to conform the blank in general to the shape of the die cavity without at the same time having imparted thereto any sharp radii or any other detail formations of the die.

In the just described stage of the process with the ram pressure increasing up to about 4 tons and the pressure forces being applied to the core 10—11 by the downward movement of the rubber ram parts 10—18, 10—17, the ram bushing 58 follows said ram parts downwardly assisting in the shortening of the blank without exerting any substantial shaping action on its upper region. The nose portion 58—3 of the ram bushing protects the upper edge of the blank 8 against being peaned over by the rubber of the bulging plug or core entering into the space between the nose of the ram bushing and the metal blank.

As the ram pressure is further increased from 4 to about 5 tons, the outward expanding force of the bulging core or plug causes the blank to be parted by the parting elements of inserts 74 and 77, thereby separating the lensring and the bottom cap from the main housing shell section of the blank. As the pressure is further increased to about 6 tons, the three blank sections have been brought to their final length in their positions within the die, the change in the overall length of the three sections between the 4 ton stage and the 6 ton stage being only about .005 to .010 inch, which is only a small fraction of the total overall reduction of the length of about .20 to .35 inch from the original length of about 8 inches.

In the process stage just described, when the applied ram pressure reaches about 5 tons, the sections of the blank which are parted are retained in their position within the die by loose interengagement of partially formed detail elements of the die such as threads, fluting, ridges and the like, the blank portions having been slightly indented by the said detail portions of the die against which they have been forced by the expanding core. As the applied ram pressure reaches about 6 tons, the outwardly expanding core or plug has completed about 40% of the individual shape details such as threads, fluting, ridges, radii that are to be given to the finally shaped article.

At this stage of the process, at which the ram pressure has reached about 6 tons, substantially all parts of the partially shaped parts have substantially the same thickness as the original thickness of the blank. It will be understood that in the actual operation of the process and apparatus, the pressure is preferably applied in a single stroke; the more or less arbitrary division of the bulging step into three stages for purposes of explaining the process is justified by a study that has been made of the effects obtained when the pressure has been applied in predetermined varying amounts. A study of the grain structure of the metal which has been subjected to a forming pressure of 6 tons as described above, shows practically no distortion of the grain structure in substantially all materially deformed regions of the blank, this applying also to the region of the sharp indentations or beads 17 at this stage of the process, this being the region which has undergone maximum deformation.

*Bulging ram body and its relationship to bulging core or plug*

There will be now described the critical relation of the characteristics of the flowable bulging ram bodies or sections 10—17, 10—18 to the bulging core 10—11 in securing proper shaping of the article by the process of the invention.

This will be explained by a reference to Figs. 4, 4–A, 4–B and 4–C. In accordance with the invention, it is of critical importance that the lower inward part 10—18 of the flowable bulging ram which acts on the bulging core placed within the metal blank be of relatively soft material which will flow or be compressed under a relatively lower pressure than the part 10—17 of the bulging ram body which is behind it and which separates it from the metal ram plunger 56 by means of which the shaping or compressive forces are ultimately imparted to the bulging core.

Fig. 4 shows in a general way the over-all configuration of the inward part of the bulging ram body when it is comprised of sections 10—17, 10—18 in its relation to the bulging core 10—11 into which it has been advanced by the metal ram plunger 56 of the press. The adjoining part of the bulging core or plug 10—11 against which the inward part 10—18 of the bulging ram body is pressed, has been spread away therefrom, both into the deeper part of the die cavity as well as towards the sides of the die cavity.

When the bulging ram body is made up of two sections, such as is indicated in Fig. 4, it is important that upper part of section 10—17 of the bulging ram body which is interposed between the inward relatively soft part 10—18 thereof and the rigid outer metal ram 56 be of substantially greater hardness than the inward ram body. Thus, if the outer part 10—17 of the ram is made of the same degree or similar degree of softness as the inward part 10—18 of the bulging ram body, the downward movement of the metal ram plunger causes the adjoining outer part of the flowable bulging ram body to be forced with substantial pressure in a lateral direction and some of the flowable material thereof to enter into the almost negligibly small gap spaces at the parting lines. In other words, the downwardly moved and compressed relatively soft, flowable material of the ram body section 10—17 would be forced laterally and in backward direction and would enter the small gap crevices between the metal ram plunger 56 and the surrounding ram bushing 58 as well as between the ram bushing 58 and the surrounding die head cylinder 54 and also into the minute gap spacing at the parting line between the die head cylinder or plate 54 and the die proper. In addition, such soft outward part of the flowable ram body flows with such great pressure in lateral direction against the surrounding surfaces of the ram bushing 58 as to grip it frictionally and become interlocked therewith. In addition, it will be observed that it is important in obtaining the results desired by the instant invention that at least a portion of the bulging ram body that forms part of the composite bulging structure be made of an elastic rubber-like material of a greater hardness and less compressibility than the portion of the composite core which is to be compressed first by the initial application of axial pressure, this portion of the core being disposable within a predetermined inner region of the blank and die cavity.

Desirable action—similar to that obtained with a bulging ram body of Figs. 2 and 4 which has an inward section 10—18 of relatively great softness and an outer section 10—17 of relatively great hardness such as represented by the ram section 10—17 of 70 durometer hardness and 10—18 of 40 durometer hardness—may be also obtained by making the entire flowable bulging ram of rubberlike material of the higher hardness such as 70 durometer provided the inward part thereof is joined to the outer part thereof by an intermediate region of smaller cross-section which permits the inward part to readily expand in lateral direction and to collapse along the intermediate region of smaller cross-section and provided the inner portion is of a frusto conical shape to provide a vertical relief of 5° to 7°, for example. An example of such ram structure is shown in Figs. 4–B and 4–C. It has a ram bushing 58, as in Fig. 4, in which is positioned a flowable ram body structure comprising an upper ram section 30—18 separated from a lower ram section 30—16 by a recessed ram section 30—17. The lower flowable ram section 30—16 is of frusto conical shape. In preparing a flowable ram with the intermediate region of smaller cross-section of the type described in connection with Figs. 4–B and 4–C for shaping equipment of the invention, care must be taken that the region 30—17 of the reduced cross-section be made of a width and height of such character and be adjoined to the adjacent wider regions 30—16 and 30—18 of the flowable ram by junction regions of proper curvature in order to assure the desired spreading and collapsing action of the inward ram section 30—16 of the flowable ram in the course of performing the shaping operation of the invention as illustrated by Figs. 4–B and 4–C.

In any event, regardless of whether the bulging ram body is made in one section or several sections, it is important that it be of such a structure that during the initial part of the bulging operation it will initially act to channel the pressure inserted thereon by the ram plunger 56 down through the core 10—11 to a predetermined point.

In the specific application of the invention as herein described, the shaping operation is completed by increasing the pressure from about 6 tons to about 18 tons which pressure gives a finished article of the desired general and detail shape.

One phase of the present invention is based on the discovery that the erratic action of prior art elongated bulging cores during the compression thereof may be effectively overcome by making at least some of the longitudinal sections of such a core of composite rubber formations wherein rubber formations of a different degree of hardness are placed in side by side position within the core in such manner that the endwise pressure applied to the longitudinal core causes the portion of the rubber core furthest removed from the point of initial pressure application to initially expand in an outward direction toward the adjacent blank areas while permitting the outward end of the blank or that portion of the blank disposed more closely adjacent to the point of initial pressure application to move freely and uniformly within the die cavity and to the inward portions thereof.

In the particular type of core used in the specific applications described above, the laterally differentiated rubber core extends over the major part of the length of the blank from the inward region wherein shaped details are to be formed on the blank up to the open end of the blank. The part of the bulging core which is furthest removed from the point where axial pressure is initially applied thereto is made of a relatively soft and easily compressed rubber material as compared to the other parts of the core, in order to permit it to be readily compressed by the initial pressure wave transmitted as a result of the initial pressure forces applied by the ram to the outer end of the core. As pointed out above, with the laterally differentiated core arrangement of the invention, the application of the increasingly applied ram pressure to the outward end of the core causes the remote or far end of the core to be first compressed and successive outward sections of the core become successively and uniformly saturated with pressure in a manner that may be represented by a cone with the base at the inner end of the core and the vertex at the outer end of the core. The pressure of successive outer regions of the core increases thus continuously and uniformly in a cone-like progression as the pressure applied by the ram increases from 0 up to about 5 tons in the initial stage of the process. Because of the cone-like pressure wave buildup in the longitudinal core, the outer end of the core exerts little lateral bulging pressure on the facing portions of the blank thereby permitting the metal of the blank to move or flow relatively to the die cavity surfaces towards the desired end position without substantial frictional resistance therewith, thus assuring that the outer end of the blank is shortened in a controlled manner and moved or fed toward the regions of the upper die cavity surfaces which are to give it the desired final shape.

At the end of the initial part of the pressure stroke, in the course of which the pressure that was exerted on the core increased progressively beginning from a point or area remotely located from the point of initial pressure application and thereafter back towards the point of pressure application in a somewhat conical progression, the pressure on the individual longitudinal sections of the rubber bulging core will in a sense become equalized and balanced. At the end of this preliminary stage of the process wherein there is a substantial balance of the compressive forces acting on the rubber core, the following conditions are believed to prevail. The forces exerted by ram pressure are balanced against the frictional forces existing between the composite core and the blank on the one hand, the blank and the die cavity on the other hand, and also with the opposing forces contained in the compressed composite core itself.

In the next part of the pressure stroke with the pressure increasing from about 5 to 15 tons the movement of the ram is only small, about 3/16 of an inch. The composite core which was brought to a stage of balanced compression forces when the 5 ton pressure stage was reached, will still maintain a substantially balanced pattern of forces within the die cavity.

Experimental tests have shown that if the pattern of forces as so established is disturbed, the increase of the pressure from 5 to 15 tons results in destruction of the blank. It has been found impossible to produce out of the blank an acceptable shaped article by the increased pressure of the shaping stroke no matter how high the pressure is increased. Thus, if a portion of the die is artificially displaced by only .003 inch to allow partial unbalanced die movement, and the balanced force and pressure pattern thereby disturbed, the article shaped out of the blank by the full shaping stroke will be cracked open and even if not cracked, will show severe strains in the form of V, W or X patterns and the fine detail will be completely malformed. The foregoing considerations also apply to the last stage of the process in which the pressure is increased from about 15 to 18 tons.

In the particular arrangement shown in the figures described above, the composite shaping core or plug is advantageously provided with a rubber ring-like core section 10—15 of substantially greater hardness than core sections 10—14 and 10—13, to wit, 70 durometer, positioned so that it engages the portions of the blank which are forced outwardly toward the shaped details of the inserts 75, 76, 77 of the die cavity during the initial stage of the pressure stroke, that is, at 5 tons pressure . This hard rubber section 10—15 of the core assures that in the initial pressure and force pattern buildup of the core, it does not cause any portions of the core to be forced outwardly with sufficient force to cause the blank engaged thereby to come into shaping engagement with the detail shaping inserts 75, 76 and 77. Thus, without such hard rubber insert 10—15, the initial conical buildup of the pressure and force buildup in the rubber core in the initial part of the pressure stroke would cause the blank to be forced into parting engagement with the cutting edge 77 before the upper portion of the blank is similarly forced into cutting engagement with the cutting edge of the upper cutting insert 74.

In practice, it has been found that rubber core and ram body sections 10—11 and 10—18 are subjected to materially different degrees of deformation or displacement and should be separable from each other along their surfaces of engagement or slip lines. This is desirable because depending on the degree of deformation or hardness, the individual parts of the core and ram establish different patterns of forces and pressures as the part of the balance force pattern which has to be maintained in the overall operation.

Thus, in practice, the rubber-like ram body sections 10—17 and 10—18 will move as a unit with the movement of the solid ram plunger 56 although there is no mechanical joint between them, the vacuum created by the return movement of the solid ram plunger 56 causing the upper ram section 10—18 to move with it. A similar vacuum created by the return movement of the ram section 10—18 causes it to return the adjacent ram section 10—17, this return action being assisted by the elastic restoring forces of the core, which returns to its released shape when the ram plunger 56 is retracted.

However, if desired, the solid ram plunger 40—56 may be provided with a pin extension passing into a recess in the adjacent rubber ram body section 40—17 as illustrated in Figs. 9 and 10.

Another important critical phase of the invention is the dimensional relationship of the rubber ram body elements 10—17 and 10—18 to the rubber elements of the core 10—11. In particular, it is essential that the width of the rubber elements 10—18 of the ram be smaller than the inside width of the blank and core against which it is brought by the pressure stroke. This relationship is critical because it represents a simple practical way for establishing in a controlled manner the limited low pressure condition in the upper part of the core during the initial part of the ram stroke which initial low pressure condition is propagated to the remote part of the core 10—11 in such manner that a further pressure increase accompanying the inward motion of the ram plunger 56 and its rubber elements causes the pressure to be built up in a uniform cone-like manner from the part of the core which is removed or remote from the point of initial pressure application back towards its forward end or the part of the core which is initially subjected to pressure.

The critical importance of the special features of the invention described above, is illustrated by the graphs of Fig. 7 in conjunction with the Figs. 8–A and 8–B showing details of the final article. A shaped detail of the final article obtained by the specific process of the invention is described above and a modified process of the invention will be described hereinafter. In the graph of Fig. 7, the different columns marked 6, 9, . . . 18 indicate the pressure in tons applied by the ram to the bulging core. The three vertical row sections marked Good, Fair and Poor indicate the degree of perfection with which the bulging operation is preformed at the different pressures at the different conditions indicated by the legends applied to the graphs.

Graph A–1 and A–2 indicate the degree of perfection of the final article produced with the process of the invention as carried on with a rubber or rubber-like bulging ram and core as described and shown above, A–1 indicating the detail at the upper end of the article, A–2 the details at the lower end. The desired proper formation of the details represented by graphs A–1, A–2 is indicated in Fig. 8–B by showing how perfectly the thread formed in the blank conforms to the shape of the thread provided by the die cavity. Graphs B–1, B–2 represent analogous conditions where the article was formed with a modified composite core of the invention described hereinafter utilizing a steel center rod, which yields results which are fair and maintains uniform production, but is inferior to the results obtained as represented by graphs A–1, A–2. The results obtained by the conditions shown in the graphs as Fair are indicated in Fig. 8–A, wherein the thread portion 15 of the shell housing 21 analogous to that of Fig. 8–B does not conform fully to the shape of the thread 73–1 of the die cavity giving, however, a thread formation which makes the article commercially acceptable. The graphs C–1, C–2 analogous to graphs A–1, A–2 were obtained with a process carried on with the same equipment as described above but using a bulging core of a rubber core having 50 durometer hardness. It will be noted by the shape of the graphs C–1, C–2 that at different ram pressures applied, the detail shapes imparted to the blank changes in a haphazard manner between Fair and Poor. These graphs C–1, C–2 were obtained as a result of careful check of operations of a press embodying the features of the instant invention and an article produced under the conditions represented by the graph was commercially unacceptable. Furthermore, at best, only one in ten or even less articles produced with a one-grade rubber core will have a shape which can be represented by graphs C–1, C–2 as most of the others are severely misshaped.

Below are additional data which bring out the significance of the process of the invention.

Considering the detail represented by the ridge or groove 17 formed in the shaped article, the table below indicates the progress of the complete detail under different conditions, and thereby indicates the relative efficiency of the three core constructions above described.

PROCEDURE

|  | 1 | 2 | 3 |
|---|---|---|---|
|  | Percent | Percent | Percent |
| 6 tons | 40 | 40 | 75 |
| 9 tons | 80 | 50 | 85 |
| 12 tons | 100 | 80 | 95 |
| 15 tons |  | 100 | 100 |

Column 1 indicates the conditions of operating with a composite core 10—11 of the type described above. Column 2, the conditions with a core having a steel rod in the center, column 3, a core of the same grade of rubber throughout.

As seen by column 1, the composite core delayed the formation of detail in the preliminary stages, the detail having been formed to an extent of only 40%, and having been completed as the pressure was increased from 6 tons to 12 tons in a substantially controlled uniform manner. In the process of column 2, the formation of detail was also formed to 40% in the initial operating stage up to 6-ton pressure, and the detail was completed only after increasing the pressure to 15 tons, but the progression was not progressively uniform. In the process of column 3, 75% of the detail was already finished at 6 tons, indicating a frictional locking of at least portions of the blank within the die because although the particular detail was formed to an extent of 75%, other details were not formed; in the further processing this locking action upset the formation of the details and in most cases destroyed the article or provided only a very poor finished article.

*The nose piece*

The nose piece of the ram bushing 58 has been described above, but it has certain characteristics which cooperate in a unique way to obtain the desired result which require further explanation. The nose piece is located and dimensioned in such a way as to center the work piece blank at the start of the bulging process. Thus, the spacing 58–2 serves to locate the blank in position. As the blank in bulging shrinks longitudinally, the nose piece applies balanced pressure to aid in the longitudinal shrinking of the blank 20, but the said nose piece does not prevent separation of the blank therefrom when the end of the blank is about to be forced into the upper part 1—11 of the cavity. The pressure applied by the nose piece is balanced with respect to the expanding forces of the core 10—11 to produce widening of the blank 20 in the proper places.

It will also be noted that the contour 58–3 of the nose piece is smooth so as to reduce friction or locking of the bulging ram body portion 10—18 during the latter's return into the ram cavity on release of the final pressure. It has been found that when bulging ram or core portions 10–18 etc. fail, it is usually due to wear and tear caused by the return stroke. This is one reason why the ram body portion 30—18 of Fig. 4–B is made conical.

The opening in the nose piece is smaller than the opening in the blank 20. This structure prevents the blank 20 from destroying said bulging ram portion 10—18, and it prevents the ram portion 10—18 from harming the end of the blank 20 by providing a relief cavity adjacent the nose piece at least until the final bulging takes place, and it provides for the rapid and unhampered return of the portion 10—18 when pressure is released, the said portion 10—18 being pushed back by the stored-up pressure in the core 10—11. On the other hand, the opening in the nose piece is large enough to provide for a minimum axial flow of ram body portion 10—18 (until the final stage of the bulging) relative to the total volumetric displacement.

In the last stage of the bulging action, the ram 10—18 is of such hardness (or softness) or alternatively the ram 30—18 is of such shape (see Fig. 4–C) so as to apply radial pressure and form the flange 11 (see Fig. 1 or 4).

Fig. 9 shows a modified form of shaping equipment of the invention for producing shaped articles by a process of the invention in which the composite core is formed with an inner rod of substantially rigid metal in lieu of the soft rubber core of the core of Fig. 1. Instead of a cup-shaped blank, a tubular blank is employed. Otherwise, the equipment 8—21 of Fig. 9 is generally similar to that of Fig. 2. The ram has a rubber outer ram section 40—17 of 70 durometer hardness and an inner ram section 40—18 of 40 durometer hardness as the similar ram of Fig. 2. The metal ram plunger 40—56 includes a projecting pin portion 40—57. The bulging core 8—21 has an outer section 8—13 of 40 durometer hardness, an intermediate core section 8—12 extending over the major length of the blank 20—1 having 60 durometer hardness and an inward core section 8—15 of 35 durometer hardness. The central part of the core has positioned therein a rigid rod 8—11, for instance, of hard metal such as tool steel and a void or opening 8—14 is formed in the portion of the rubber core overlying the upper end of the rod.

In the particular application of the process of the invention shown in Fig. 9, it is utilized to form only the main tubular housing section of the flashlight with the same shape as shown in Fig. 1, but without the lens ring and the bottom cap.

In forming the desired shaped housing shell, the following phases of the process are of critical significance. A relief recess 9—11 in the nose of bushing 9—12 assures the proper sequence of operations as follows. In the initial stage of the ram stroke, the compressed upper core section causes the upper portion of the blank to be moved inwardly into the die, the ram bushing 9—12 in this set-up being held fixed in the die head which has been brought to the die closing position before the start of the ram movement. As the outer or top part of the blank is moved inwardly by the lateral pressure of the upper soft part of the core, the upper edge of the blank reaches a position substantially at the upper level 9—20 of the die cavity in which it is separated by a narrow gap from the adjacent nose portions of the bushing 9—12. The close gap-spacing between the edge of the blank and the nose portion which separates the soft rubber core of 40 durometer hardness from the recess 9—11 behind the bushing nose portion provides a relief for the buildup of pressure. In other words, the gap space serves as an expansion space which assures that any rubber which is pushed beyond the gap into the recess 9—11 does not exert any pressure on the edge of the blank and prevents any rubber from deforming the edge in inward direction or peening and folding it over itself.

The bottom region of the die is provided with a similar gap 9—13 adjacent the region in which the lower edge of the blank is seated. As a result, the pressure buildup imparted to the inward core section 8—15 which is of 35 durometer hardness is permitted to increase without developing too much pressure at the region of the core adjacent the gap space 9—13 whereby the pressure is held down below the level at which the compressed rubber tends to enter into the narrow gap space between the bottom edge of the blank and the adjacent portions of the die, in which case it could distort the blank and cause it to be peened or folded over. The bottom portion of the core is engaged by a solid rigid protrusion 9—17 in the bottom part of the die so that the lowest bottom portion of the core is formed only of a relatively narrow cylindrical wall 9—14 which limits or retards the buildup of the pressure in this bottommost wall portion until the pressure throughout the core has been built up to a balanced stage and all the metal portions of the blank have reached their final position with respect to the die in the initial stage of the pressure buildup corresponding to about 5 tons. At this 5 ton stage of the process the pressure buildup in the rubber wall region 9—14 is below the level at which it tends to force the adjacent wall portions of the blank into a frictional locking engagement with the threaded detail of the die insert 15 in a manner analogous to that described with the corresponding parts of Fig. 1. The foregoing applies also to the development of the pressure conditions in the upper parts of the core in the regions opposite the threaded details of the die insert 16.

Fig. 10 shows a further modified form of shaping equipment of the invention for producing shaped articles by the process of the invention. It comprises a split die 30 similar to that of Fig. 2 having formed therein a die cavity 31 of a shape corresponding to that of a conventional two-part housing shell of a conventional lamp socket shown in Fig. 11.

The die cavity body has an upper die section 32 with thread details 32—1 corresponding to the threaded open end of the shell. The adjoining die section has a shape corresponding to the adjacent generally cylindrical body of the shell 20—2. The next adjacent portion of the die is formed by a die insert 33 with a knife edge which parts the cap (see Fig. 11) from the housing part of the shell. The adjoining lower region of the die has another die insert 34 with a plurality of inwardly projecting points 34—1 which produce locking teeth 34—2 in the cap by which it is interlocked with corrugations 34—3 and locking nibs of the bottom edge region of the housing shell. The bottom portion 35 of the die provides a die cavity section corresponding to the shape of the cap neck region which is formed therein.

The upper open end of the die cavity is closed by a removable die head 41 carrying with it the movable solid ram plunger 43 and they are arranged so that after the pressure stroke is started, the die head 41 is brought to a position wherein it closes the die cavity whereupon the die ram plunger 43 is moved by hydraulic pressure to its end position of the stroke.

The blank 20—2 which is to be shaped may be of hard aluminum such as produced by impact extrusion of a thick, solid, generally circular blank giving a generally thin-walled simple metal blank having hard walls of a thickness of about .023 inch having a tensile strength of about 22,000 p.s.i., approximately 4% elongation in ¾ inch length, and a fine grain structure. Within the blank is placed a composite plug or core having (1) a flowable bulging body 44 of 60 durometer hardness, (2) a flowable inner body part 45 of 40 durometer hardness, (3) a solid core body member 46 of generally conical shape in the central region of the inner core body 45 and the adjoining inner portion of the outer core body 44, being located in cavities or severances formed in bodies 44 and 45. The portion of the core body 44 overlying the upper part of the solid core member 46 has formed therein a cavity space 47, the significance of which will be explained hereafter. The solid core member insert 46 is provided with a seating portion which sits in the open rear end of the neck portion of the blank and has an overlying flange 46—1 which engages the inner surface of the neck of the blank when the bulging core is subjected to the ram pressure stroke. A space 47—1 is enclosed between flange 46—1 and the lower section 45 of said rubber plug or core 44.

The solid ram 43 has interposed between it and the upper part 44 of the core a flowable ram body 48 which is chosen to be of such rubber-like composition in its different parts or of such shape as to cause it to operate on the core in the manner explained in connection with the corresponding parts of Figs. 1, 4, 4–B and 4–C.

The die is also provided with one or two cutting inserts 36 arranged so that when the blank is forced by the expanding core in outward direction, one or two slots 26—1 are cut in the upper portion of the shell in accordance with standard lamp socket requirements. Die inserts 36—1 similar to die inserts 36 are also positioned at other segmental regions of the die for forming in the lower portion of the shell housing, which is cut off from the cap, the conventional holding crimps and nibs 26—2.

As seen in Fig. 10, the width of the bulging ram portion 48 is smaller than the width of the die cavity, this being a critical requirement for proper operation of the forming process of the invention. In other words, the general configuration of the plug 48 is frusto conical.

There will now be described an operating sequence analogous to that described in connection with Fig. 1 by which the blank of Fig. 10 is formed into a two-part socket housing shell and cap.

Fig. 10 indicates only in a general way, the relationship of the die parts and the original blank in its original condition. The upper edge of the blank protrudes above the upper edge of the die cavity by a distance of at least about .040 inch and not more than at most about .075 inch. The edge of this protruding part of the blank is engaged by the downwardly descending die head 41 and the further movement of the die head to its closed position expands the blank outwardly into the die cavity causing the region of the blank walls facing the region of the teeth 34—1 to move or flow toward the areas of the die walls provided with teeth 34—1.

At this initial stage of the forming process, the core body 44 has not been subjected to any increase of pressure greater than required for preventing the upper edge region of the blank from being collapsed inwardly toward the central axis of the core body as the metal is being pushed or caused to flow downwardly toward the innermost portions of the die cavity by means of the die head 41. The inner or lower soft core body portion 45 offers substantially no resistance to the movement of the surrounding portions of the blank when it is being pushed downwardly into the die by the inward movement of the outer part of the blank.

*Pressure—pattern relationship*

After first closing the cavity by the die head, the initial movement of the ram with the pressure increasing from 0 to 2½ tons causes the composite core to establish a cone-like pressure build-up from the deepest or lowermost part of the core in the die to the outward end which at about 2½ tons reaches a substantially balanced overall state. In this initial stage of the process, the force pattern developed in the composite core causes the blank to generally come into only light surface engagement with the surfaces of the die cavity while being free to move in an outwardly direction without any further shortening of the blank. As the ram pressure reaches about 2½ tons, the force pattern established in the composite core causes it to force the wall portions of the blank against the cutting and shaping inserts 33, 34 so that at this stage of the process, the cap is parted from the housing shell. At this stage of the process, only the cutting edges of the cutting insert 33 are fully effective in cutting or parting the cap section from the housing section of the blank, the edges of the other shaping inserts 34 becoming fully effective only in a later stage of the process just before the full pressure of about 6¼ tons is applied to the ram.

When the pressure stroke reaches about 3 tons, the first parting stage of the forming stroke has been fully completed and the preliminary shaping of the blank whereby it conforms to the general configuration of the die is finished without having formed in the blank any details such as the threads, nibs, beads and like shaping details of the die.

As the pressure is further increased from 3 tons to about 6 tons, the balanced pattern of forces established in the composite core at the 3 ton stage is not materially changed, but all flowable portions of the core have been subjected to increased pressures and forces in which the portions of the core facing the blank assume a thrust position in a direction substantially perpendicular to the blank surface for performing the final shaping operation in the last stage of the shaping stroke. In the last stage of the pressure stroke, as the ram pressure is increased from about 6 tons to 6¼, the compressed composite core body acts substantially instantaneously in applying the established force pattern to force the blank with the developed thrust action into all detail formations of the die thereby causing the blank to assume a complete mirror image or imprint of the die in which even very fine grinding or polishing marks of the die cavity are impressed on the exterior of the so-formed shaped article.

As explained in connection with the process described in connection with Fig. 1, any disturbance of the force pattern during the latter stage of the process such as displacement of one of the die parts of Fig. 15 by more than .002 inch, will upset the operation and the blank which was subjected to the shaping action will have its shaped details malformed or distorted. In some cases, the blank will be cracked and it will usually show severe local strains in the form of X, V or W patterns.

Thus, in the manufacture of the above described item of Fig. 11, a total pressure of 6–6½ tons is employed whereas those familiar with rubber bulging processes would apply 75–100 tons for bulging such an item. The lower pressures employed by the process of this invention are the result of the discovery that the pattern of force can be controlled to bulge a blank at low pressure and that the pattern of force is more important than the total pressure employed. Attempts to make such items by the use of 75 tons of pressure without the establishment of a pattern of forces were unsuccessful because (1) the metal cracked, (2) the product, even if not cracked, had the severe local strains referred to above, (3) the huge back pressure developed destroyed the rubber die in a short time, (4) the back pressure tended to lift up the die requiring large forces to hold the die in place, etc. By the proper balance of forces, no substantial part of the pressure is left over from the pressure just required to expand the blank. Standard bulging procedures utilize rubber as if the rubber were a liquid whereas according to the present invention, the partial solid characteristics of the rubber is taken advantage of to establish a pattern of force which differentiates in the transmission of the pressure as to the time sequence, the physical amount of flow and the direction of flow.

Figs. 13–15 show a modified form of equipment for producing a lamp socket housing out of a hard metal blank by the process and equipment of the invention. Fig. 13 shows elements of the die structure and bulging equipment similar to those of Fig. 10. Within the die cavity 150 of the die 154 is positioned a shell blank 112 out of which the desired shaped socket housing 112—1 shown in Fig. 15 is formed.

In accordance with the invention the hollow hard metal shell blank 112 out of which the shaped socket housing 112—1 is formed, is made of a metal, such as aluminum or an aluminum alloy, as follows: In a suitable die casting machine having die cavities of a shape corresponding to the metal slug 109 shown in Fig. 12, there are cast out aluminum slugs 109 of a shape shown in Fig. 12. In the specific process herein described, the slug 109 has an outside diameter of 1¼" and an axial thickness or height of 5/16". Out of such slugs 109 are produced by impact extrusion hard metal shell blanks 112, the thin walls of which have been work-hardened by the impact extrusion process.

In accordance with the invention, the metal shell blank 112 with its work-hardened thin walls, without annealing it, is subjected to the bulging process of the invention by which the relatively brittle thin walls of the metal blank are given the desired final shape of the lamp socket housing as seen in Fig. 15.

The hydraulic press equipment of Figs. 13 to 15 is similar to that described above in connection with Figs. 2 and 10. The die structure 154 is arranged to cooperate with a movable die head 158 which is actuated by the hydraulic pressure to move towards the die structure 154 and close the die in the position in which it is shown in Figs. 14 and 15 in a way analogous to that described in connection with Fig. 2. Within the die head 158 is movably positioned the ram plunger 152, the hydraulic press being so arranged that when the hydraulic pressure of a pressure stroke is applied, the die head 158 is first brought to the closed position of Figs. 14, 15 in the initial part of the stroke, and thereafter the hydraulic pressure causes the rigid ram 152 together with the flowable bulging ram 167 carried by it in the direction of the die cavity 150 of the die 154 until the bulging stroke is completed and the blank 112 given the desired final shape.

In accordance with the invention, a hollow metal blank 112 having work-hardened and hard but relatively brittle thin walls is given the desired relatively complicated shape of the die cavity 150 surrounding it by placing within the hollow interior of the blank a bulging structure of flowable but substantially incompressible material having sections of different hardness and sections of different interior structure strength so that—when the bulging structure is compressed under a predetermined set pressure—the metal blank 112 will be deformed by differential bulging forces exerted thereon in a differential sequence by different elements of the bulging structure in directions substantially perpendicular to different surfaces of the blank 112 engaged thereby for bulging and expanding the work-hardened thin blank walls toward the differently shaped facing die cavity surface portions while maintaining the major part of the axial blank length in a floating condition until near the end of the bulging stroke.

The composite bulging structure of Figs. 13–15 generally comprises an elongated bulging core 161 and a separate adjoining coacting bulging ram body 167 disposed in an opening in die head 158, each formed of flowable but substantially bulging material, such as rubber, although they may constitute parts of a single composite elongated bulging structure. The bulging core 161 and bulging ram 167 are of elongated shape and substantially coaxial with the elongated die cavity 150 and the elongated tubular metal blank 112. The bulging ram 167 is of a smaller width than the bulging core 161 and its operative charatceristics are identical with those explained in connection with the similar ram 30—17 of Figs. 4–B, 4–C.

The bulging core member 161 substantially fills the thin-walled interior of the hollow metal blank 112 and is provided at its inner axial end with a rigid end bulging section 162 which may be made of metal and of modified configurations as indicated in Figures 14 and 15. The rigid end bulging section 162 is provided with a projection 164 projecting into a cavity 164—1 of the flowable bulging member 161. The projection 164 of member 162 is shown as having a generally conical shape tapering down into a substantially cylindrical end portion of smaller cross-sectional area than the tapering part thereof.

The interior cavity of the flowable bulging member 161 serves to interiorly sever or cavitate an axial section of the flowable bulging member 161 thereby materially reducing the ability of the surrounding flowable body portions 161—1, 161—2, 161—3 of the bulging member 161 to resist outward lateral deformation in a direction toward the surrounding blank wall portions and the coacting surrounding wider die cavity surface regions towards which the flowable bulging body portions 161—1, 161—2, 161—3 are forced when external axial pressure is applied against the upper end region of the bulging member 161.

By providing the rigid bulging end section 162 with a tapering filler insert projection 164 engaging a correspondingly shaped interior cavity of the flowable bulging member 161, there is obtained proper guidance of the surrounding flowable material of the bulging member 161 when it is subjected to axial pressure forces transmitted by external pressure applied to the upper end of the die cavity by the flowable bulging ram 167 as it is being forced into the die cavity 150 by the hydraulic pressure applied to the associated ram plunger 152. This arrangement of the tapering rigid filler 164 assures that the flowable bulging material which is moved by the applied pressure in a direction towards the rigid bulging section 162 is properly guided in an outward lateral direction by the outwardly tapering guide surfaces of the filler body 164.

The bulging ram 167 is likewise formed of a flowable compressible material such as rubber, the hardness of which is correlated in a predetermined manner to the hardness of the adjoining bulging core member 161. In the specific bulging arrangement used for forming out of the hollow metal blank 112 the shaped housing structure 112—1 of Fig. 15, the bulging core 161 consisted of rubber having 40 durometer hardness while the bulging ram 167 consisted of rubber having 70 durometer hardness. By combining two axially aligned flowable bulging members consisting of a bulging core and a bulging ram, each having a different degree of hardness, together with metal insert 162, axial pressing forces applied to one end of the axially aligned bulging members will cause the one with smaller hardness to flow in laterally outward direction before the axially applied pressing forces have reached the magnitude at which they cause the bulging member of greater hardness to likewise flow in laterally outward direction. In this way metal can be fed or caused to flow to the points where a particular contour is desired prior to any frictional locking of the blank surface to the die surfaces whereby further flow of the metal in the case of such frictional locking would cause a stretching and thinning of the metal.

In an advantageous embodiment of the invention, the upper flowable bulging ram 167 is provided with an upper region having a cavity 168 seated on a rigid stem 152—1 of the rigid plunger 152 of the hydraulic press. The internal severance of the upper body portion of the flowable bulging ram 167 provided by its cavity 168 likewise sets up in it differential force transmitting characteristics in such manner as to secure the desired differential action in transmitting forces to the adjoining bulging core 161.

By way of example, with the specific arrangement and characteristics of the two flowable bulging core 161 and bulging ram 167 explained above, application of the initial axial pressing forces, as by the downward movement of ram plunger 152 towards the die cavity 150, will cause the center part of the upper end of the bulging core 161 to absorb the first pressure wave and direct it axially towards the stem 164 of its rigid bottom member 162 of the bulging core. In fact, the peripheral regions 161—5 of the upper end of the bulging core 161 are caused to be pulled towards the center thereof under the action of the axial pressing forces transmitted thereto by the downwardly moving harder bulging ram 167.

Under the action of the initial pressure wave applied by the hard bulging ram 167, the softer bulging core 161 transmits this pressure wave in axial direction towards the stem 164 of its rigid end bulging insert 162 while the upper side regions 161—5, 164—4 of the bulging core 161 exert only very slight forces on the surrounding thin walls of the shell blank 112 and permit the metal blank walls to slide past it. The rigid end bulging core 162 with its stem 164 has an axial core 164—2 so that it may collapse in case of excessive pressure rather than permit buildup of excessive pressure forces in the flowable bulging core 161 in laterally outward direction under abnormal conditions with the possibility of causing damage to the die.

Figs. 13, 14, 15 indicate in a general way, the differential action of the different parts of the flowable bulging ram 167 and bulging core 161 during successive stages of a bulging stroke produced by a downward pressure stroke of the ram plunger 152 together with the die head 158 toward the die 154 and its die cavity when the hydraulic pressure is applied as by a pump in accordance with the predetermined pressure setting of the pressure valve as explained above in connection with Fig. 2.

Fig. 13 indicates the conditions at the initial stage of the pressure stroke. The pressure of the ram plunger 152 is transmitted by the bottom portions of the hard flowable bulging ram 167 in axial direction to the softer bulging core 161 which likewise initially transmits the pressure wave in axial direction, indicated by the arrows 172, 173 and 174 to its rigid bottom part 162. Since the bulging ram 167 is of relatively great hardness, it acts almost as a solid body while the softer bulging core 161 transmits the axial forces under slight flexing of its bottom region 161—1, 161—2, 161—3.

In accordance with the invention, the hard hollow metal blank 112 (Fig. 13) which is to be shaped is made longer than the shaped housing 112—1 (Fig. 15) which is to be formed therefrom, the length of blank 112 being sufficiently longer so that it partially collapses or shrinks in an axial direction during the initial part of the pressure forming stroke to provide an excess of axial wall material length for forming therewith the side parts of the shaped housing body without unduly or substantially reducing the thickness of any wall portions of the blank while performing the full bulging operation. Thus, Fig. 13 shows the upper end of the thin-walled shell blank 112 projecting above the upper level of the female die 154 and its die cavity 150, and Fig. 14 shows an early stage of the pressure stroke in which a portion of the hollow metal blank walls 112 which extended above the level of the die cavity 150 was forced inwardly into the die cavity 150.

In a process stage preceding somewhat that shown in Fig. 14, after the upwardly projecting end region of the blank 112 was moved inwardly down to the upper level of the die cavity 150, the axial compression wave applied to the softer bulging core 161 causes it to apply slight pressure against the upper wall regions of the blank 112. At the same time, the axially transmitted pressure wave causes the internally severed or cavitated lower bulging member regions 161—1, 161—2 to be pressed outwardly (as indicated by the arrow 178 of Fig. 14) thereby causing the surrounding wall portions of the hollow blank 112 to move outwardly and generally assume the configuration of the die. This generally conformed part of the partially collapsed hollow blank 112 which enters die cavity portions 124—1, 117—1 permits subsequent outward bulging of these thin blank wall portions without materially or substantially decreasing their wall thickness. This forming action also absorbs all excess materials yielding a final shaped housing structure of Fig. 15 of uniform length without requiring for this purpose original blanks 112 of identical length. This feature permits the manufacture of shaped housings such as shown in Fig. 15 from blanks shown in Fig. 13 exhibiting substantial variations in length.

In this earlier stage of the pressure stroke preceding that shown in Fig. 14 the axially pressure wave transmitted by hard bulging ram 167, through bulging core 161 to the stem 164 of the rigid bulging end member 162 causes the latter to force some of the metal of the conical end wall 162—2 of the hollow blank 112 toward the curved bottom shaping surface 169—1 of the female bottom die member 156.

In the process stage shown in Fig. 14, the axial pressure forces applied to the softer flowable bulging core 161 causes its outer wall portions 161—5, 161—3, 161—2, 161—1 to apply lateral forming forces generally in the direction of arrows 175, 176, 177 and 178 to the wall portions of the hollow blank 112 facing the wider cavity surface regions thus causing the hard thin side walls of the metal blank 112 to be substantially pressed into light slidable contact with the different cavity surface regions of the die cavity 150 but without forming in the thin metal walls of the hollow blank 112 any sharp details of the shaped die cavity surface such as its threads, or the lug nibs 151—1.

Fig. 15 indicates the condition at the end of the pressure stroke under full hydraulic pressure of predetermined magnitude set by the pressure valve and applied to the press and its plunger 152. The axial downward pressure applied to the upper part of the softer bulging member 161 now causes the entire length of this bulging member to exert the required axially lateral outward pressure against the side walls of the hollow blank 112, thereby causing its exterior to be formed by the shaping surfaces of the die cavity 150 into a shaped hollow structure having all the desired details including threads, nibs, and fine indentations as well as the piercing of the blank wall for forming thereon the tooth-like cap lugs 125. The axially transmitted pressure also causes the end region 162—2 of the blank to be deformed and somewhat thinned by the rigid end bulging member 162 so as to conform to the adjacent domed shaping surface 116—1 of the die cavity. Arrows 178—2 indicate the large lateral bulging forces now applied for shaping the lower part of the blank 112 into the shape of die cavity surface regions 117—1, 125—1. Similarly, arrows 175—2 indicate the large lateral bulging forces now applied for shaping the upper part of the blank 112 into the shape of the die cavity surface regions 120—1, 119—1. The blank 112 is thus formed into a mirror image of the cavity surface of the die cavity 150.

As indicated in Fig. 15, the full radial pressure thus developed throughout the length of the softer bulging member 161, the blank material of the thicker end wall 162—2—which was previously moved by the rigid end member in outward direction toward the die cavity region 117—1—caused this blank wall material to be expanded to substantially uniform thickness as it is brought in shaping contact with the die cavity surface portions 117—1 and 125—1 and thereby shaping it to conform thereto. The downward pressure forces applied by the hydraulic press plunger 152 to the bulging core 161 are thus coverted by it into generally radial pressure forces acting in a direction substantially perpendicular to the surface portions of the hollow blank 112 as indicated by the arrows 171—1, 175—1, 176—1, 177—1 and 178—2, in Fig. 15 thereby forming it into a shape determined by the inner cavity surface of the die cavity 150 with clear details of all piercings, chamfers, threads, indentations and the like without in any way shortening the length of the hollow blank 112, although no positive restraint is applied to any portions of the axial length thereof.

Tests have shown that in order to produce by a bulging operation of the invention, a desired strong hollow thin-walled metal body out of a hard non-annealed hollow metal blank, the final stage of the bulging operation must be completed in an explosive movement of the bulging structure while the blank undergoes an axial movement not greater than about .002 inch. Tests have shown that if the axial displacement of the blank within the die in the last stage of the bulging stroke exceeds .003 inch, there will result complete distortion in the mirror image of the die cavity surface formed in the exterior surface of the bulged blank.

In forming the housing of Fig. 15 out of the blank of Fig. 13 by the bulging process of the invention described above, the particular bulging equipment shown operated with a speed of about 46 strokes per minute, corresponding to a stroke distance of about ¼ inch per .003 second. Since the mirror image of the die cavity surface is distorted by an axial displacement of the blank of only .003 inch, such distortion corresponds to only about .00035 of a second which takes place at the end of the stroke. The foregoing considerations thus establish that the mirror image of the cavity surface is impressed on the blank in the last instance of the pressure stroke which lasts only about .00035 second, and is thus of an explosive character.

Without thereby in any way limiting the scope of the invention, there are given below structural data of the hollow metal blank 112 shown in Fig. 13 and of the shaped housing structure 112—1 shown in Fig. 15 formed therefrom by the bulging operation of the invention explained above. The hollow aluminum blank 112, which was formed by impact extrusion of an aluminum slug shown in Fig. 12, had a total height of 2¾ inches; its narrow side walls were 2⁵⁄₁₆ inches long, it had an outer diameter 1¼ inches and a thickness of .024 inch. The blank 112 had a Brinell hardness 58 (Rockwell 15T) and a tensile strength 21,000 p.s.i. The shaped housing structure 112—1 formed from the blank 112 by the method of the invention and shown in Fig. 15 had a cap with a cylindrical rim 1¹¹⁄₃₂ inches and a total height of ⅞ inch, and its cylindrical housing body 11 had a height of 1⁵⁄₁₆ inch. The tensile strength of the shaped housing was 29,000 p.s.i. and it had substantially the hardness. The process of the invention thus results in giving to shaped aluminum housing a tensile strength materially in excess of known aluminum materials as published in authoritative reference date supplied by the manufacturers and in the Metal Handbook of the American Society of Metals, 1948 edition.

In accordance with the principles of the invention, the different axial sections of the combined bulging structure—such as the bulging member 161 with its severed region 164—1, and the adjoining harder bulging member 167 comprised of portions 167—3 and 167—4—must be shaped and proportioned, with respect to the length of any internally severed or cavitated portions thereof as to secure the desired differential action in transforming initial axially applied pressure forces into laterally outward bulging forces exerted by different regions of the combined bulging structures to assure that the different axial sections of the bulging structure which have to perform the largest outward bulging operation shall yield in lateral directions before other axially disposed sections of the bulging structure yield in lateral direction. During bulging the rubber-like core members are so controllably compressed that the major compression of the same is initiated at a point or area remote from the point or area of initial pressure application. Further compression of the bulging core is also controlled whereby it will gradually progress backwardly from the area of initial compression and toward the area of initial pressure application. In this way metal will be readily pushed or caused to flow toward selected metal forming areas in the female die without at the same time causing the metal in the blank to be frictionally locked to the surfaces of the female die until the very end of the bulging operation. This also means that as the metal is fed to the selected wall areas of the female die no substantial elongation and thinning of the metal will occur. On the other hand, this stretching and thinning of the metal is a normal incident to frictional locking of the metal to the die surfaces in prior art bulging practices.

In performing a bulging operation of the invention, none of the axially disposed blank sections of the hollow thin metal blank are clamped in a positive way against the adjacent wall portions of the die, as by pressing, for instance, a rigid clamping member against a flange of the metal blank for positively clamping and fixing it against the rigid wall surface of the female die structure.

In performing bulging operations of the invention, the different axial sections of the composite flowable bulging structure are so shaped and proportioned and/or so formed of material of different hardness, that the axial forces applied to the bulging structure are converted by it into a predetermined controlled sequence of axial and radial pressures developed in different axial sections of the bulging structure and exerted thereby on the surrounding blank walls.

In certain instances when forming the lower part of the shaped article out of a hollow blank having a thicker end wall than the side walls, the bulging structure and the bulging operation is carried out in such manner that the thicker end wall portion of the blank has applied thereto forces which tend to move the material of the thicker wall in outward direction toward the side walls for providing therein additional wall material that is formed into the outwardly expanded side wall portions of the shaped article having a minimum wall thickness which is substantially the same or slightly smaller than the thickness of other side wall portions of the blank. To this end, the section of the flowable bulging structure acting on the thick wall portion of the blank, may be made of rigid material, in the form of a metal insert, for instances, such as shown at 162 in Figs. 13 to 15.

Thus the terminology "without substantial stretching and thinning of the metal in the wall portions of the blank" as used herein and in the appended claims means that at least the major wall portions or the thin wall areas of the blank are not subjected to a frictional locking engagement with the various wall surfaces of the female die cavity until the very end of the bulging operation. This is to preclude the possibility, as indicated above, of the metal as it is being moved in the die to the areas where it is being formed into sharp or intricate details from being stretched and elongated into these forming areas instead of being merely pushed or flowed into these areas. When stretching and elongation of the metal occurs, there inherently will be a thinning and frequently a fracturing of the metal in the areas where stretching and elongation occur.

Figs. 16, 17, 18 illustrate another phase of the invention involving a novel way for producing a shaped housing structure with desired detailed configurations by a process and equipment of the invention. In the particular application shown in Figs. 16, 17, 18, a flashlight housing of the type described above in connection with Fig. 1 is produced in a novel way as follows:

There are first produced circular metal slugs similar to slug 109 of Fig. 12, of a metal such as aluminum by casting a suitable aluminum alloy in a die casting machine into the desired circularly-shaped conical slugs similar to those shown in Fig. 12. The slugs are cast to have sufficient size and volume as to make it possible to produce out of them by an impact extrusion a long tubular blank 6—10 such as shown in Fig. 16. The blank 6—10 of Fig. 16 has at one end a thick walled neck 6—11 adjoined by an end wall portion 6—12 to a long hollow tubular aluminum metal structure 6—13 which may be of generally circular shape and similar in general character to the hollow metal blank 112 of Fig. 13.

After thus forming the hard metal blank generally designated 6—10 as shown in Fig. 16, its neck end 6—11 along with its end are upset or folded inwardly into the shape 6—20 indicated in Fig. 17. The slug out of which the blank 6—10 is produced by impact extrusion is made of sufficient size and volume so as to make it possible to provide a blank 6—10 of sufficient size and metal volume as to enable it to be formed into a composite flashlight housing structure of the shape such as shown in Fig. 18. The blank 6—10 of Fig. 16, after it is upset to the shape 6—20 shown in Fig. 17 has an upper neck portion 6—21 adjoined by an outwardly tapering wall portion 6—22 to a generally tubular housing body 6—23, all of generally circular cross-section.

The upset blank 6—20 of Fig. 17 is thereafter further shaped by a bulging operation to give it the shape of a flashlight housing generally designated 6—30, in Fig. 18 together with a lensring 6—40. The combined flashlight housing elements of Fig. 18 comprising flashlight housing 6—30 and lens-ring 6—40 of Fig. 18 are formed out of the single hard metal blank 6—29 of Fig. 17 by placing the blank into a die such as described in connection with Figs. 2 through 4 having a die cavity conforming to the shape of the combined housing structure 6—30, 6—40 of Fig. 18. When performing the bulging operation just described, the blank 6—20 of Fig. 17 is placed in a die, such as shown in Fig. 3, with the neck end 6—21 in the bottom portion of the die corresponding to the position of blank 8 in Fig. 3 and blank 20—2 in Fig. 10. As in the process described in connection with Figs. 2 to 4 and Fig. 10, the bulging operation and equipment similar to that described in connection with Figs. 3 to 10, parts the blank 6—20 of Fig. 17 into two sections out of which are formed the desired shaped flashlight housing 6—30 and the desired lensring 6—40 of Fig. 18.

The shaped flashlight housing 6—30 so produced by the bulging operation has neck portion 6—31 which may be provided with a thread 6—37 for threading into it the threaded outer base terminal of a small flashlight bulb. The threaded neck portion 6—31 is adjoined by surrounding reflector wall 6—32 which is shaped to reflect the light of the flashlight bulb in the same manner as the reflectors used in conventional flashlights. In order to serve as a reflector, the outward surface of the reflector wall 6—32 of the flashlight housing 6—30 is polished and provided with a mirror surface of silver, for instance, in the same way the reflector surfaces of conventional flashlights.

The reflector wall 6—32 of the flashlight housing 6—30 is adjoined by generally cylindrical collar portion 6—33 having thereon threads 6—34 arranged for threaded engagement with threads 6—44 of the lensring 6—40 shown in Fig. 18 which was formed of the same blank 6—20. The threaded upper portion of the flashlight housing of Fig. 18 is adjoined by the elongated tubular housing 6—35 in which the batteries are housed. This main tubular housing wall 6—35 may be of circular or rectangular cross-section, as in conventional flashlight housings, and is provided with longitudinal stiffening flutes 6—36 and it embodies essentially all other shaped features of a conventional flashlight housing, all of which are formed in this housing section 6—35 by a single bulging stroke in the manner described above in connection with Figs. 2 to 4 and 10.

The shaped features of the flashlight housing 6—35 of Fig. 18 also include the threaded lower end 6—37 arranged to receive the threaded border of a closure cap, such as closure cap 30 shown in Fig. 1.

The lensring 6—40 which is formed with the flashlight housing 6—30 of the single blank 6—20 of Fig. 17 by a single bulging stroke is of the shape similar to lensring 10 of Fig. 1 and is produced by the same bulging stroke which produces the shaped flashlight housing 6—30 by an operation similar to that described above in connection with Figs. 2 through 8-B.

The features and principles underlying the invention described above in connection with specific exemplifications will suggest to those skilled in the art many other modifications thereof. It is accordingly desired that the appended claims shall not be limited to any specific features or details shown and described in connection with exemplifications thereof.

I claim:

1. The method of producing a predetermined configuration in a thin walled hollow blank of metal which is flowable under pressure while maintaining substantially the same thickness in the wall portions of the finished article as that of the initial metal blank, comprising the steps of positioning the metal blank within a hollow die cavity having the predetermined configuration, positioning within said blank a portion of a composite bulging structure comprised at least in part of a plurality of elastic rubber-like members of different hardness and different degrees of compressibility whereby various portions of the said structure when subjected to the same pressure have non-uniform expansion characteristics and with the elastic rubber-like member which is disposable at least in part in a predetermined inner region of the blank and die cavity being one of said members having the least resistance to compression, applying axial pressure to a selected portion of said composite bulging structure sufficient to produce differential flow of the elastic rubber-like members and a controllable channeling of the pressure transmitted through the structure to said predetermined inner region of the die cavity by virtue of the differential flow of the rubber-like members, initiating the principal radial outward expansion and flow of the portion of the bulging structure disposed in the blank and the radial outward flow of metal in said blank in said inner region of the die cavity and at a point spaced from the starting point of said axial pressure, continuing the application of pressure in such a fashion as to produce a continued flow of metal in the blank radially outward from the said inner region of the die cavity in progressive increments back toward the starting point of said axial pressure so as to conform the blank in general to the configuration of the die cavity and during the said radial flow of the metal in the blank maintaining at least the major part of the axial length of the blank in a floating condition with respect to the wall surfaces of the die cavity until near the end of the application of pressure whereby the blank will be drawn into the die cavity and into the configuration of the wall surfaces of the die cavity without any substantial frictional resistance with the said wall surfaces of the die cavity.

2. The method as set forth in claim 1 including the step of positively pushing and feeding the metal into the die cavity and toward a selected wall area thereof during the initial application of axial pressure to said bulging structure with said feeding aiding the radial expansion of the blank and with a shortening of the axial length of the blank taking place as a result of said radial expansion.

3. The method as set forth in claim 1 including the step of effecting a severing of individual portions of the blank from each other upon the application of a predetermined amount of pressure to said bulging structure and while said blank is confined within said cavity.

4. The method as set forth in claim 1 while using a previously unannealed metal blank.

5. The method as set forth in claim 1 including the step of forcing the metal in the blank to flow into full surface-to-surface contact with the wall portions of the die cavity at the end of the application of pressure.

6. The method as set forth in claim 1 while using a single application of pressure.

7. The method of producing a predetermined configuration in a thin walled hollow blank of metal which is flowable under pressure while maintaining substantially the same thickness in the wall portions of the finished article as that of the starting hollow metal blank, comprising the steps of positioning the metal blank within a hollow die cavity having the predetermined configuration, positioning in said blank a composite core the various portions of which when subjected to pressure have non-uniform characteristics with a portion of the core which is disposable in a predetermined inner region of the blank and die cavity being composed at least in part of a readily compressible elastic rubber-like material, interposing a ram body at least a portion of which is of elastic rubber-like material of a greater hardness and less compressibility than said last-mentioned portion of the core between said composite core and a rigid pressure applying surface, applying axial pressure to said body and to a selected part of said composite core sufficient to produce a differential expansion and compression of the body and core as well as a controlled channeling of the pressure transmitted through the core to the last-mentioned portion of the core and the said inner region of the blank and die cavity by virtue of the differential expansion of the body and core, initiating the principal radial outward expansion and flow of the core and the radial outward flow of metal in said blank in said inner region of the blank and die cavity and at a point which is spaced from the starting point of said axial pressure, continuing the application of pressure in such a fashion as to produce a continued flow of metal in the blank radially outward from the said inner region of the die cavity in progressive increments back toward the starting point of said axial pressure so as to conform the blank in general to the configuration of the die cavity and during the said radial flow of the metal in the blank maintaining at least the major part of the axial length of the blank in a floating condition with respect to the wall surfaces of the die cavity until near the end of the application of pressure whereby the blank will be drawn into the die cavity and into the configuration of the wall surfaces of the die cavity without any substantial frictional resistance with the said wall surfaces of the die cavity.

8. The method as set forth in claim 7 including the step of positively pushing and feeding the metal into the die cavity and toward a selected wall area thereof during the initial application of axial pressure to said core, with said feeding aiding the radial expansion of the blank and with a shortening of the axial length of the blank taking place as a result of said radial expansion.

9. The method as set forth in claim 7 including the step of effecting a severing of individual portions of the blank from each other upon the application of a predetermined amount of pressure to said core and while said blank is confined within said cavity.

10. A method as set forth in claim 7 while using a previously unannealed metal blank.

11. A method as set forth in claim 7 including the step of forcing the metal in the blank to flow into full surface-to-surface contact with the wall portions of the die cavity at the end of the application of pressure.

12. The method as set forth in claim 7 while using a single application of pressure.

13. An apparatus for shaping a predetermined portion of a wall of a hollow blank of metal which is flowable under pressure and which has at least one open end comprising the combination of a blank receiving female die the wall portions of which have the configuration of the finished article, ram means for shaping said blank within said female die, said ram means including a ram plunger, a composite core insertable in the blank and a bulging ram body interposed between and axially aligned with said plunger and core, said composite core comprising a plurality of core elements, at least one of said core elements being composed of an elastic rubber-like material such that the said core element is of a greater compressibility and less hardness than another of said core elements, a portion of said first-mentioned core element also being insertable within a predetermined inner region of the blank and the female die and at least a portion of said bulging ram body also being made of an elastic rubber-like material of a greater hardness and less compressibility than said first-mentioned core element of the composite core, said ram body and said core being adapted upon the activation of said ram means to transmit the pressure exerted by the said ram plunger to said first-mentioned core element and said ram body and said composite core also being operative upon the actuation of said ram means to initially produce a compression of said portion of said first-mentioned core element of said composite core in a major amount within the said inner region of the female die prior to the building up of full compression of the remaining compressible portions of said composite core.

14. An apparatus as set forth in claim 13 wherein another of said core elements is made from an elastic rubber-like material of greater hardness and less compressibility than said first-mentioned core element but of less hardness and greater compressibility than at least a portion of said ram body, said last-mentioned core element being insertable in said blank in such a fashion that it will be interposed between the initially compressible portion of said first-mentioned core element and the outer end of the core.

15. An apparatus as set forth in claim 13 wherein said female die is provided with at least one blank cutting means for severing portions of said blank from each other upon a predetermined compression of said composite core and a predetermined radial expansion of a portion of a blank wall.

16. An apparatus as set forth in claim 13 wherein said composite core is provided with a weakened hollowed out part disposable adjacent said inner region of the die cavity and a metal filler member disposed in at least a portion of said hollowed out part.

17. An apparatus as set forth in claim 13 wherein said ram body is comprised of an outer ram body section and an inner ram body section, said inner ram body section being composed of an elastic rubber-like material of less hardness and greater compressibility than said outer ram body section, said outer ram body section also being that portion of the ram body which is of a greater hardness and less compressibility than said first-mentioned core element.

18. An apparatus as set forth in claim 13 wherein said ram body is of a smaller cross section than the portion of said composite core against which the ram body is brought by the application of pressure thereto.

19. An apparatus as set forth in claim 13 wherein said ram means includes a tubular sleeve-like member disposed adjacent to and movable toward the female die for engaging the blank wall adjacent the open end of the blank and for pushing the metal blank into the female die during the initial motivation of the ram means.

20. An apparatus as set forth in claim 19 wherein the sleeve-like member is provided with groove means within which the portion of the blank wall engaged by said sleevelike member is removably seated during such engagement.

21. An apparatus for shaping predetermined portions of a wall of a hollow blank of metal which is flowable under pressure and which has at least one open end comprising the combination of a blank receiving female die the wall portions of which have the configuration of the finished article, ram means for bulging said blank within said female die, said ram means including a ram plunger, a composite core insertable in the blank and a bulging ram body aligned with and interposed between said core and said plunger, said composite core comprising a plurality of differentially expandable core elements, at least one of said core elements being comprised of a readily compressible elastic rubber-like material and another of said core elements being hard and relatively noncompressible, a portion of said first-mentioned core element also being insertable within a predetermined inner region of the blank and the female die and at least a portion of said ram body being made of an elastic rubber-like material of a greater hardness and less compressibility than said first-mentioned core element of the composite core, said ram body being adapted upon the activation of said ram means to transmit the pressure exerted by the said ram plunger through the core and to said first-mentioned core element, said ram body and said composite core being operative upon the actuation of said ram means for initially producing a compression of said first-mentioned core element of said composite body in a major amount within said inner region of the female die prior to the build-up of full compression of the remaining compressible portions of said composite core.

22. An apparatus as set forth in claim 21 wherein another of said core elements is made from an elastic rubber-like material of greater hardness and less compressibility than said first-mentioned core element but of less hardness and greater compressibility than at least a portion of said ram body, said last-mentioned core element being insertable in said blank in such a fashion that it is interposed between at least a portion of said first-mentioned core element and the ram body.

23. An apparatus as set forth in claim 21 wherein said female die is provided with at least one blank cutting means for severing portions of said blank from each other upon a predetermined compression of said composite core and a predetermined radial expansion of a portion of a blank wall.

24. An apparatus as set forth in claim 21 wherein said ram body is of a smaller cross section than the portion of said composite core against which it is brought by the application of pressure thereto.

25. An apparatus as set forth in claim 21 wherein said ram body is comprised of an outer ram body section and an inner ram body section, said inner ram body section being composed of an elastic rubber-like material of less hardness and greater compressibility than said outer ram body section, said outer ram body section also being that portion of the ram body which is of a greater hardness and less compressibility than said first-mentioned core element.

26. An apparatus as set forth in claim 21 wherein said ram means includes a tubular sleeve-like member disposed adjacent to and movable toward the female die for engaging the open end of the blank and for pushing the metal blank into the female die during the initial motivation of the ram means.

27. An apparatus as set forth in claim 26 wherein the sleeve-like member is provided with groove means within which the portion of the blank wall engaged by said sleeve-like member is removably seated during such engagement.

28. An apparatus for shaping a portion of a thin walled blank of metal which is flowable under pressure and which has at least one open end comprising the combination of a blank receiving female die the wall portions of which have the configuration of the finished article, ram means for bulging said blank within said female die, said ram means including a ram plunger, a composite core insertable in the blank located in the female die and a bulging ram body interposed between and axially aligned with said core and plunger, said composite core comprising a plurality of successive contiguous elastic rubber-like core elements of different hardnesses and different resistances to compression with a core element having the least resistance to compression being insertable within a predetermined inner region of the blank and the female die and other core elements having more resistance to compression being interposed between said first-mentioned core element and the open end of the blank, at least a portion of said ram body also being made of an elastic rubber-like material which is of a greater hardness than the core element of said composite core having the said least resistance to compression, said ram body and said composite core being operative upon the activation of said ram means for initially producing a compression of said first-mentioned core element in a major amount within said inner region of the female die prior to the build-up of full compression of the other core elements.

29. An apparatus as set forth in claim 28 wherein said female die is provided with at least one blank cutting means for severing portions of said blank from each other upon a predetermined differential compression of said composite core and a predetermined radial expansion of a portion of a blank wall.

30. An apparatus as set forth in claim 28 wherein said ram body is comprised of an outer ram body section and an inner ram body section, said inner ram body section being composed of an elastic rubber-like material of less hardness and greater compressibility than said outer ram body section, said outer ram body section also being that portion of the ram body which is of a greater hardness and compressibility than the core element having the least resistance to compression.

31. An apparatus as set forth in claim 28 wherein said ram body is of a smaller cross section than the portion of said composite core against which the ram body is brought by the application of pressure thereto.

32. An apparatus as set forth in claim 28 wherein said composite core is provided with a weakened hollowed out part disposable adjacent said inner region of the die cavity and a metal filler member deposited in at least a portion of said hollowed out part.

33. An apparatus as set forth in claim 28 wherein said ram means includes a tubular sleeve-like member disposed adjacent and movable toward the female die for engaging the open end of the blank and for pushing the metal blank into the female die during the initial motivation of the ram means.

34. An apparatus as set forth in claim 33 wherein said sleeve-like member is provided with groove means within which the portion of the blank wall engaged by said sleeve-like member is removably seated during such engagement.

References Cited in the file of this patent

UNITED STATES PATENTS

| | | |
|---|---|---|
| 601,825 | Conners | Apr. 5, 1898 |
| 616,764 | Bourke | Dec. 27, 1898 |
| 682,299 | Walsh | Sept. 10, 1901 |
| 1,041,406 | Bauroth | Oct. 15, 1912 |
| 1,099,873 | Bowen | June 9, 1914 |
| 1,151,222 | Scrimgeour | Aug. 24, 1915 |
| 1,389,739 | Carlson | Sept. 6, 1921 |
| 1,460,769 | Saunders | July 3, 1923 |
| 1,930,745 | Fisher | Oct. 17, 1933 |
| 2,001,760 | Barker | May 21, 1935 |
| 2,132,002 | Hight | Oct. 4, 1938 |
| 2,133,445 | Guerin | Oct. 18, 1938 |
| 2,238,212 | Cornell | Apr. 15, 1941 |
| 2,243,809 | Wendell | May 27, 1941 |
| 2,313,689 | Waters | Mar. 9, 1943 |
| 2,377,664 | Berger | June 5, 1945 |
| 2,603,175 | Wurzburger | July 15, 1952 |
| 2,606,516 | Raynes | Aug. 12, 1952 |
| 2,696,184 | Demarest | Dec. 7, 1954 |
| 2,742,873 | Moore | Apr. 24, 1956 |

FOREIGN PATENTS

| | | |
|---|---|---|
| 353,684 | France | Sept. 18, 1905 |

OTHER REFERENCES

Martin: Abstract of Application 173,293, filed July 12, 1950, published Jan. 13, 1953, vol. OG 666, p. 602.

Watts: Abstract of Application 131,759, published Oct. 28, 1953, 663 OG 1223.

UNITED STATES PATENT OFFICE
CERTIFICATE OF CORRECTION

Patent No. 2,966,872                      January 3, 1961

Karl C. Schmocker

It is hereby certified that error appears in the above numbered patent requiring correction and that the said Letters Patent should read as corrected below.

Column 2, line 63, for "group" read -- graph --; column 12, line 39, for "degre" read -- degree --; column 13, line 14, for " preformed" read -- performed --; column 19, line 27, for "charatceristics" read -- characteristics --; column 23, line 5, for "13/16" read -- 1 3/16 --; column 24, line 5, for "instances" read -- instance --; same column, line 46, after "end" insert -- wall 6-12 --.

Signed and sealed this 21st day of November 1961.

(SEAL)
Attest:

ERNEST W. SWIDER
Attesting Officer

DAVID L. LADD
Commissioner of Pat-
USCOMM.